United States Patent
Younes et al.

(10) Patent No.: US 11,617,981 B1
(45) Date of Patent: Apr. 4, 2023

(54) METHOD FOR CAPTURING CO2 WITH ASSISTED VAPOR COMPRESSION

(71) Applicant: Saudi Arabian Oil Company, Dhahran (SA)

(72) Inventors: Mourad Younes, Dhahran (SA);
Ammar Alahmed, Dhahran (SA);
Abdullah Al Rammah, Dhahran (SA);
Aqil Jamal, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/567,670

(22) Filed: Jan. 3, 2022

(51) Int. Cl.
| | |
|---|---|
| *B01D 53/02* | (2006.01) |
| *B01D 53/14* | (2006.01) |
| *B01D 53/75* | (2006.01) |
| *B01D 53/83* | (2006.01) |

(52) U.S. Cl.
CPC ....... *B01D 53/025* (2013.01); *B01D 53/1475* (2013.01); *B01D 53/75* (2013.01); *B01D 53/83* (2013.01); *B01D 2257/504* (2013.01); *B01D 2258/0283* (2013.01); *B01D 2258/06* (2013.01)

(58) Field of Classification Search
CPC ...... B01D 53/025; B01D 53/83; B01D 53/75; B01D 53/1475; B01D 2258/0283; B01D 2257/504; B01D 2258/06; B01D 53/62; A61L 9/00; Y02C 20/40
See application file for complete search history.

(56) References Cited

U.S. PATENT DOCUMENTS

| | | | |
|---|---|---|---|
| 978,576 | A | 12/1910 | Goodell |
| 2,694,678 | A | 1/1951 | George et al. |
| 2,614,066 | A | 10/1952 | Cornell |
| 2,645,611 | A | 7/1953 | Axtell |
| 2,753,301 | A | 7/1956 | Bersworth et al. |
| 2,910,426 | A | 10/1959 | Gluesenkamp |
| 3,278,268 | A | 10/1966 | Pfefferle, Jr. |
| 3,409,540 | A | 11/1968 | Gould et al. |
| 3,533,938 | A | 10/1970 | Leas |
| 3,702,292 | A | 11/1972 | Burich |
| 3,726,789 | A | 4/1973 | Kovach |
| 3,755,143 | A | 8/1973 | Hosoi et al. |
| 3,856,659 | A | 12/1974 | Owen |
| 3,979,757 | A | 9/1976 | Kilby et al. |
| 4,090,949 | A | 5/1978 | Owen et al. |
| 4,106,952 | A | 8/1978 | Kravitz |
| 4,134,824 | A | 1/1979 | Kamm et al. |
| 4,264,435 | A | 4/1981 | Read, Jr. et al. |

(Continued)

FOREIGN PATENT DOCUMENTS

| | | |
|---|---|---|
| AU | 2003286894 | 6/2004 |
| AU | 2005286952 | 3/2006 |

(Continued)

OTHER PUBLICATIONS

U.S. Appl. No. 17/118,075, filed Dec. 10, 2020, Al-Rowaili et al.

(Continued)

*Primary Examiner* — Timothy C Vanoy
(74) *Attorney, Agent, or Firm* — Fish & Richardson P.C.

(57) ABSTRACT

The present application provides processes and systems for direct capture of $CO_2$ from an ambient air or a flue gas using large excess of steam and a vapor compression cycle.

54 Claims, 2 Drawing Sheets

(56) References Cited

U.S. PATENT DOCUMENTS

| | | |
|---|---|---|
| 4,297,203 A | 10/1981 | Ford et al. |
| 4,426,276 A | 1/1984 | Dean et al. |
| 4,466,946 A | 8/1984 | Goddin, Jr. et al. |
| 4,527,003 A | 7/1985 | Okamoto et al. |
| 4,587,011 A | 5/1986 | Okamoto et al. |
| 4,589,896 A | 5/1986 | Chen et al. |
| 4,655,904 A | 4/1987 | Okamoto et al. |
| 4,717,407 A | 1/1988 | Choe et al. |
| 4,725,349 A | 2/1988 | Okamoto et al. |
| 4,786,400 A | 11/1988 | Farnsworth |
| 4,830,728 A | 5/1989 | Herbst et al. |
| 4,981,676 A | 1/1991 | Minet et al. |
| 4,992,160 A | 2/1991 | Long et al. |
| 5,068,057 A | 11/1991 | Gustafson |
| 5,091,351 A | 2/1992 | Murakawa et al. |
| 5,108,581 A | 4/1992 | Aldridge |
| 5,140,049 A | 8/1992 | Fiato et al. |
| 5,229,102 A | 7/1993 | Minet et al. |
| 5,366,712 A | 11/1994 | Violante |
| 5,401,300 A | 3/1995 | Lokhandwala et al. |
| 5,407,466 A | 4/1995 | Lokhandwala et al. |
| 5,407,467 A | 4/1995 | Lokhandwala et al. |
| 5,733,839 A | 3/1998 | Espinoza |
| 5,746,985 A | 5/1998 | Takahashi |
| 5,837,032 A | 11/1998 | Moll et al. |
| 5,904,837 A | 5/1999 | Fujiyama |
| 5,906,728 A | 5/1999 | Iaccino et al. |
| 5,951,850 A | 9/1999 | Ino et al. |
| 5,997,594 A | 12/1999 | Edlund et al. |
| 6,033,555 A | 3/2000 | Chen et al. |
| 6,119,606 A | 9/2000 | Clark |
| 6,153,163 A | 11/2000 | Prasad |
| 6,179,900 B1 | 1/2001 | Behling et al. |
| 6,180,081 B1 | 1/2001 | Poschmann et al. |
| 6,190,533 B1 | 2/2001 | Bradow et al. |
| 6,210,562 B1 | 3/2001 | Xie et al. |
| 6,214,485 B1 | 4/2001 | Barnett et al. |
| 6,274,032 B2 | 8/2001 | Hood et al. |
| 6,293,979 B1 | 9/2001 | Choudhary et al. |
| 6,296,686 B1 | 10/2001 | Prasad et al. |
| 6,338,833 B1 | 1/2002 | Aasberg-Petersen |
| 6,361,582 B1 | 3/2002 | Pinnau et al. |
| 6,444,712 B1 | 9/2002 | Janda |
| 6,531,515 B2 | 3/2003 | Moore, Jr. et al. |
| 6,656,346 B2 | 12/2003 | Ino et al. |
| 6,743,961 B2 | 6/2004 | Powers |
| 6,787,576 B2 | 9/2004 | Kiss et al. |
| 6,830,596 B1 | 12/2004 | Deckman et al. |
| 6,896,717 B2 | 5/2005 | Pinnau et al. |
| 6,960,235 B2 | 11/2005 | Morse et al. |
| 6,979,757 B2 | 12/2005 | Powers |
| 7,019,187 B2 | 3/2006 | Powers |
| 7,022,165 B2 | 4/2006 | Paglieri et al. |
| 7,025,941 B1 | 4/2006 | Autenrieth et al. |
| 7,045,554 B2 | 5/2006 | Raje |
| 7,112,271 B2 | 9/2006 | Jo et al. |
| 7,132,042 B2 | 11/2006 | Genetti et al. |
| 7,182,917 B2 | 2/2007 | Krueger |
| 7,217,304 B2 | 5/2007 | Deckman et al. |
| 7,323,148 B2 | 1/2008 | Shah et al. |
| 7,353,982 B2 | 4/2008 | Li |
| 7,374,664 B2 | 5/2008 | Powers |
| 7,396,449 B2 | 7/2008 | Powers |
| 7,404,889 B1 | 7/2008 | Powers |
| 7,419,584 B2 | 9/2008 | Stell et al. |
| 7,501,051 B2 | 3/2009 | Shieh et al. |
| 7,527,661 B2 | 5/2009 | Chellappa et al. |
| 7,550,642 B2 | 6/2009 | Powers |
| 7,642,292 B2 | 1/2010 | Severinsky |
| 7,700,005 B2 | 4/2010 | Inui et al. |
| 7,744,747 B2 | 6/2010 | Halsey |
| 7,772,450 B2 | 8/2010 | Iaccino et al. |
| 7,794,690 B2 | 9/2010 | Abatzoglou et al. |
| 7,858,834 B2 | 12/2010 | Powers |
| 7,871,457 B2 | 1/2011 | Shah et al. |
| 7,906,559 B2 | 3/2011 | Olah et al. |
| 7,959,897 B2 | 6/2011 | Cui et al. |
| 7,972,498 B2 | 7/2011 | Buchanan et al. |
| 7,973,087 B2 | 7/2011 | Kibby et al. |
| 8,043,588 B2 | 10/2011 | Hustad et al. |
| 8,198,338 B2 | 6/2012 | Shulenberger et al. |
| 8,440,729 B2 | 5/2013 | Olah et al. |
| 8,500,859 B2 | 8/2013 | Eisenbeger |
| 8,518,151 B2 | 8/2013 | Tessier et al. |
| 8,563,185 B2 | 10/2013 | Assink et al. |
| 8,585,802 B2 | 11/2013 | Keller |
| 8,597,383 B2 | 12/2013 | Pham et al. |
| 8,715,394 B2 | 5/2014 | Caram et al. |
| 8,726,983 B2 | 5/2014 | Khan |
| 8,828,121 B1 | 9/2014 | He et al. |
| 8,835,517 B2 | 9/2014 | Cheiky et al. |
| 8,845,988 B2 | 9/2014 | Radosz et al. |
| 8,900,546 B2 | 12/2014 | Van De Graaf et al. |
| 8,931,347 B2 | 1/2015 | Donzier et al. |
| 9,067,850 B2 | 6/2015 | Abbott et al. |
| 9,079,770 B2 | 7/2015 | Ahmed et al. |
| 9,085,497 B2 | 7/2015 | Jennings |
| 9,090,543 B2 | 7/2015 | Schoedel et al. |
| 9,096,806 B2 | 8/2015 | Abba et al. |
| 9,102,532 B2 | 8/2015 | Iaquaniello et al. |
| 9,126,876 B2 | 9/2015 | de Jong et al. |
| 9,138,718 B2 | 9/2015 | Li et al. |
| 9,181,148 B2 | 11/2015 | Katikaneni et al. |
| 9,228,140 B2 | 1/2016 | Abba et al. |
| 9,242,230 B2 | 1/2016 | Moon et al. |
| 9,249,064 B2 | 2/2016 | Kumar et al. |
| 9,255,230 B2 | 2/2016 | Shafi et al. |
| 9,279,088 B2 | 3/2016 | Shafi et al. |
| 9,284,497 B2 | 3/2016 | Bourane et al. |
| 9,284,502 B2 | 3/2016 | Bourane et al. |
| 9,296,961 B2 | 3/2016 | Shafi et al. |
| 9,328,035 B1 | 5/2016 | Kuhn et al. |
| 9,481,938 B2 | 11/2016 | Shin et al. |
| 9,493,350 B2 | 11/2016 | Morico et al. |
| 9,499,403 B2 | 11/2016 | Al-Muhaish et al. |
| 9,504,955 B2 | 11/2016 | Elliott et al. |
| 9,527,029 B2 | 12/2016 | Elliott et al. |
| 9,624,913 B2 | 4/2017 | Friesth |
| 9,637,432 B2 | 5/2017 | Chakravarti et al. |
| 9,643,906 B2 | 5/2017 | Zubrin et al. |
| 9,676,678 B1 | 6/2017 | Agee et al. |
| 9,732,986 B2 | 8/2017 | Al-Ansary et al. |
| 9,752,080 B2 | 9/2017 | Christensen et al. |
| 9,778,534 B2 | 10/2017 | Tran et al. |
| 9,863,244 B2 | 1/2018 | Donzier et al. |
| 9,952,192 B2 | 4/2018 | Donzier et al. |
| 10,008,730 B2 | 6/2018 | Jamal et al. |
| 10,131,599 B2 | 11/2018 | Olah et al. |
| 10,131,602 B1 | 11/2018 | Gondal et al. |
| 10,160,708 B2 | 12/2018 | Lee et al. |
| 10,161,051 B2 | 12/2018 | Palmore et al. |
| 10,173,145 B2 | 1/2019 | Nishibe et al. |
| 10,279,306 B2 | 5/2019 | Gebald et al. |
| 10,283,795 B2 | 5/2019 | Jamal et al. |
| 10,329,677 B2 | 6/2019 | Geioushy et al. |
| 10,357,759 B2 | 7/2019 | D'Souza et al. |
| 10,399,003 B2 | 9/2019 | Antar et al. |
| 10,472,951 B2 | 11/2019 | Donzier et al. |
| 10,478,806 B2 | 11/2019 | Schuetzle et al. |
| 10,527,751 B2 | 1/2020 | Donzier et al. |
| 10,532,961 B2 | 1/2020 | Pan et al. |
| 10,590,548 B1 | 3/2020 | McGinnis |
| 10,800,716 B2 | 10/2020 | Bhadrashankar et al. |
| 10,821,393 B2 | 11/2020 | Elliott et al. |
| 10,953,388 B1 | 3/2021 | Harale et al. |
| 11,193,072 B2 | 12/2021 | Harale et al. |
| 11,247,897 B2 | 2/2022 | Alsolami et al. |
| 2001/0006615 A1 | 7/2001 | Badano |
| 2003/0041519 A1 | 3/2003 | Maruko |
| 2003/0129109 A1 | 7/2003 | Bronicki |
| 2003/0172589 A1 | 9/2003 | Krueger |
| 2003/0175565 A1 | 9/2003 | Noda |
| 2004/0094453 A1 | 5/2004 | Lok et al. |
| 2004/0120889 A1 | 6/2004 | Shah et al. |

(56) References Cited

U.S. PATENT DOCUMENTS

| | | |
|---|---|---|
| 2005/0045034 A1 | 3/2005 | Paglieri et al. |
| 2005/0109037 A1 | 5/2005 | Deckman et al. |
| 2005/0109821 A1 | 5/2005 | Li |
| 2005/0211603 A1 | 9/2005 | Guillaume et al. |
| 2005/0217479 A1 | 10/2005 | Hale et al. |
| 2006/0013759 A1 | 1/2006 | Jiang et al. |
| 2006/0057060 A1 | 3/2006 | Sun et al. |
| 2006/0124445 A1 | 6/2006 | Labrecque et al. |
| 2007/0157517 A1 | 6/2007 | Tsay et al. |
| 2007/0180991 A1 | 8/2007 | Chellappa et al. |
| 2007/0277870 A1 | 12/2007 | Wechsler |
| 2008/0001645 A1 | 1/2008 | Kuroki |
| 2008/0011644 A1 | 1/2008 | Dean et al. |
| 2008/0011645 A1 | 1/2008 | Dean |
| 2008/0033218 A1 | 2/2008 | Lattner et al. |
| 2008/0067077 A1 | 3/2008 | Kodera et al. |
| 2008/0083648 A1 | 4/2008 | Bishop et al. |
| 2008/0194900 A1 | 8/2008 | Bhirud |
| 2008/0277314 A1 | 11/2008 | Halsey |
| 2008/0283445 A1 | 11/2008 | Powers |
| 2009/0050523 A1 | 2/2009 | Halsey |
| 2009/0123364 A1 | 5/2009 | Forsyth et al. |
| 2009/0155650 A1 | 6/2009 | Cui et al. |
| 2009/0221723 A1 | 9/2009 | Leviness |
| 2009/0261017 A1 | 10/2009 | Iqbal |
| 2010/0089795 A1 | 4/2010 | Fujiyama et al. |
| 2010/0137458 A1 | 6/2010 | Erling |
| 2010/0193370 A1 | 8/2010 | Olah et al. |
| 2010/0260657 A1 | 10/2010 | Niitsuma et al. |
| 2011/0076225 A1 | 3/2011 | Shah et al. |
| 2011/0083996 A1 | 4/2011 | Shafi et al. |
| 2011/0089378 A1 | 4/2011 | Sato et al. |
| 2011/0114502 A1 | 5/2011 | Cole et al. |
| 2011/0177410 A1 | 7/2011 | Assink et al. |
| 2011/0247500 A1 | 10/2011 | Akhras et al. |
| 2012/0100062 A1 | 4/2012 | Nakamura et al. |
| 2012/0111051 A1 | 5/2012 | Kulkarni et al. |
| 2012/0168154 A1 | 7/2012 | Chinn et al. |
| 2012/0195824 A1 | 8/2012 | Van De Graaf et al. |
| 2012/0258037 A1 | 10/2012 | Pham et al. |
| 2012/0298200 A1 | 11/2012 | Niggemann et al. |
| 2012/0323059 A1 | 12/2012 | Liu et al. |
| 2013/0087482 A1 | 4/2013 | Haiznnann |
| 2013/0129610 A1 | 5/2013 | Kale |
| 2013/0156685 A1 | 6/2013 | Vauk et al. |
| 2013/0172432 A1 | 7/2013 | Fleys et al. |
| 2013/0202517 A1 | 8/2013 | Ayala et al. |
| 2013/0220884 A1 | 8/2013 | Bourane et al. |
| 2013/0233766 A1 | 9/2013 | Shafi et al. |
| 2013/0248419 A1 | 9/2013 | Abba |
| 2013/0256124 A1 | 10/2013 | Rahman et al. |
| 2014/0170061 A1 | 6/2014 | Chaubey et al. |
| 2014/0246399 A1 | 9/2014 | Chiba |
| 2014/0363345 A1 | 12/2014 | Li et al. |
| 2015/0037246 A1 | 2/2015 | Morico et al. |
| 2015/0047986 A1 | 2/2015 | Shin et al. |
| 2015/0053266 A1 | 2/2015 | Chen et al. |
| 2015/0166430 A1 | 6/2015 | Keusenkothen |
| 2015/0231561 A1 | 8/2015 | Reardon et al. |
| 2015/0240717 A1 | 8/2015 | Starcher et al. |
| 2015/0290575 A1 | 10/2015 | Rothermel et al. |
| 2016/0180982 A1 | 6/2016 | Engel-Herbert et al. |
| 2016/0214859 A1 | 6/2016 | Beltramini et al. |
| 2016/0223878 A1 | 8/2016 | Tran et al. |
| 2016/0264886 A1 | 9/2016 | Davydov |
| 2016/0325990 A1 | 11/2016 | Galloway |
| 2016/0340187 A1 | 11/2016 | Said et al. |
| 2017/0050845 A1 | 2/2017 | Lofberg et al. |
| 2017/0058214 A1 | 3/2017 | Oprins |
| 2017/0155360 A1 | 6/2017 | Hahn et al. |
| 2018/0066197 A1 | 3/2018 | Koseoglu et al. |
| 2018/0079643 A1 | 3/2018 | Mortensen et al. |
| 2018/0094195 A1 | 4/2018 | Lehoux et al. |
| 2018/0119026 A1 | 5/2018 | Kinzl et al. |
| 2018/0148655 A1 | 5/2018 | Low et al. |
| 2018/0187106 A1 | 7/2018 | Abudawoud et al. |
| 2018/0187107 A1 | 7/2018 | Abudawoud et al. |
| 2018/0231861 A1 | 8/2018 | Franz et al. |
| 2018/0312767 A1 | 11/2018 | Al-Sayed et al. |
| 2018/0333704 A1 | 11/2018 | Ide |
| 2018/0370796 A1 | 12/2018 | Mokheimer et al. |
| 2019/0003303 A1 | 1/2019 | Donzier et al. |
| 2019/0067706 A1 | 2/2019 | Liu et al. |
| 2019/0084428 A1 | 3/2019 | Ebert et al. |
| 2019/0112535 A1 | 4/2019 | Kinzl et al. |
| 2019/0135624 A1 | 5/2019 | Mair |
| 2019/0145161 A1 | 5/2019 | Agrawal et al. |
| 2019/0168206 A1 | 6/2019 | Yavuz et al. |
| 2019/0359894 A1 | 11/2019 | Heidel et al. |
| 2019/0376821 A1 | 12/2019 | Donzier et al. |
| 2020/0026141 A1 | 1/2020 | Brown et al. |
| 2020/0172394 A1 | 6/2020 | Han et al. |
| 2021/0163832 A1 | 6/2021 | Harale |
| 2021/0163833 A1 | 6/2021 | Harale |
| 2021/0164393 A1 | 6/2021 | Younes |
| 2021/0188633 A1 | 6/2021 | Alsolami et al. |
| 2021/0300765 A1* | 9/2021 | GilroySmith ........... F01K 13/00 |
| 2021/0309515 A1 | 10/2021 | Younes et al. |
| 2021/0394152 A1 | 12/2021 | Harale et al. |
| 2021/0395083 A1 | 12/2021 | Harale et al. |
| 2021/0395085 A1 | 12/2021 | Paglieri et al. |
| 2022/0021336 A1 | 1/2022 | Younes |
| 2022/0233996 A1* | 7/2022 | Yeganeh ............ B01D 53/0446 |

FOREIGN PATENT DOCUMENTS

| | | |
|---|---|---|
| AU | 2005287034 | 3/2006 |
| AU | 2010291148 | 3/2011 |
| AU | 2012243063 | 10/2012 |
| CA | 2458314 | 4/1999 |
| CA | 2580580 | 3/2006 |
| CA | 2580585 | 3/2006 |
| CA | 2414657 | 5/2011 |
| CA | 2547011 | 8/2011 |
| CA | 2938299 | 5/2015 |
| CN | 102736342 | 10/2012 |
| CN | 203415657 | 1/2014 |
| CN | 104098071 | 10/2014 |
| CN | 104258864 | 1/2015 |
| CN | 102482079 | 5/2016 |
| CN | 105561998 | 5/2016 |
| CN | 103596671 | 6/2016 |
| CN | 103586030 | 11/2016 |
| CN | 105197887 | 3/2017 |
| CN | 105776133 | 11/2017 |
| CN | 208563680 | 3/2019 |
| CN | 209544369 | 4/2019 |
| CN | 110600775 | 12/2019 |
| CN | 111006400 | 4/2020 |
| DE | 19809883 | 9/1999 |
| EP | 0130933 | 9/1987 |
| EP | 0684066 | 11/1995 |
| EP | 0892862 | 1/1999 |
| EP | 1024111 | 8/2000 |
| EP | 1130080 | 9/2001 |
| EP | 1294637 | 3/2003 |
| EP | 1683216 | 7/2006 |
| EP | 1789171 | 5/2007 |
| EP | 1789172 | 5/2007 |
| EP | 1828085 | 9/2007 |
| EP | 1829821 | 9/2007 |
| EP | 1967616 | 9/2008 |
| EP | 2035329 | 3/2009 |
| EP | 0909804 | 9/2010 |
| EP | 2696966 | 2/2014 |
| EP | 2825503 | 1/2015 |
| EP | 2999537 | 3/2016 |
| EP | 2473441 | 8/2018 |
| FR | 2943657 | 3/2009 |
| GB | 2461032 | 12/2009 |
| JP | H 06345405 | 12/1994 |
| JP | H 09278403 | 10/1997 |
| JP | 2943657 | 8/1999 |
| JP | 2001348205 | 12/2001 |

(56) References Cited

FOREIGN PATENT DOCUMENTS

| | | | | |
|---|---|---|---|---|
| JP | 2004502623 | 1/2004 | | |
| JP | 2004249264 | 9/2004 | | |
| JP | 2004352528 | 12/2004 | | |
| JP | 2005044601 | 2/2005 | | |
| JP | 2007190455 | 8/2007 | | |
| JP | 2008513337 | 5/2008 | | |
| JP | 2008513338 | 5/2008 | | |
| JP | 4381033 | 10/2009 | | |
| JP | 2010266155 | 11/2010 | | |
| JP | 2011195352 | 10/2011 | | |
| JP | 2011195387 | 10/2011 | | |
| JP | 2011206612 | 10/2011 | | |
| JP | 2013503807 | 2/2013 | | |
| JP | 5390448 | 10/2013 | | |
| JP | 5588581 | 8/2014 | | |
| JP | 2014519463 | 8/2014 | | |
| JP | 5611627 | 9/2014 | | |
| JP | 2014169222 | 9/2014 | | |
| JP | 6040701 | 12/2016 | | |
| JP | 6345406 | 6/2018 | | |
| KR | 101531291 | 7/2015 | | |
| KR | 2016 0 035 790 | * | 4/2016 | ......... B01D 53/1475 |
| KR | 101828938 | 2/2018 | | |
| NO | 200701530 | 4/2007 | | |
| NO | 200701532 | 6/2007 | | |
| TW | 200619136 | 6/2006 | | |
| TW | 200630158 | 9/2006 | | |
| WO | WO 2000009633 | 2/2000 | | |
| WO | WO 2000016901 | 3/2000 | | |
| WO | WO 2001064577 | 9/2001 | | |
| WO | WO 2002002460 | 1/2002 | | |
| WO | WO 2002038703 | 5/2002 | | |
| WO | WO 2002069430 | 9/2002 | | |
| WO | WO 2002070402 | 9/2002 | | |
| WO | WO 2004041714 | 5/2004 | | |
| WO | WO 2005051590 | 6/2005 | | |
| WO | WO 2006034086 | 3/2006 | | |
| WO | WO 2006034100 | 3/2006 | | |
| WO | WO 2006034103 | 3/2006 | | |
| WO | WO 2006037584 | 4/2006 | | |
| WO | WO 2006082933 | 8/2006 | | |
| WO | WO 2006097703 | 9/2006 | | |
| WO | WO 2007031713 | 3/2007 | | |
| WO | WO 2008000782 | 1/2008 | | |
| WO | WO 2009073436 | 6/2009 | | |
| WO | WO 2010009077 | 1/2010 | | |
| WO | WO 2010009082 | 1/2010 | | |
| WO | WO 2010009089 | 1/2010 | | |
| WO | WO 2010017372 | 2/2010 | | |
| WO | WO 2010107942 | 9/2010 | | |
| WO | WO 2010109106 | 9/2010 | | |
| WO | WO 2010143783 | 12/2010 | | |
| WO | WO 2011026943 | 3/2011 | | |
| WO | WO 2011063353 | 5/2011 | | |
| WO | WO 2012006429 | 1/2012 | | |
| WO | WO 2021 083 108 A2 | * | 6/2012 | ............ B01D 53/04 |
| WO | WO 2012001141 | 10/2012 | | |
| WO | WO 2012142009 | 10/2012 | | |
| WO | WO 2012143096 | 10/2012 | | |
| WO | WO 2012158673 | 11/2012 | | |
| WO | WO 2013137720 | 9/2013 | | |
| WO | WO 2015128045 | 9/2013 | | |
| WO | WO 2014053663 | 4/2014 | | |
| WO | WO 2014170184 | 10/2014 | | |
| WO | WO 2015006267 | 3/2015 | | |
| WO | WO 2015 056 272 A2 | * | 4/2015 | |
| WO | WO 2015128018 | 9/2015 | | |
| WO | WO 2015183200 | 12/2015 | | |
| WO | WO 2016069385 | 5/2016 | | |
| WO | WO 2016193736 | 12/2016 | | |
| WO | WO 2016207892 | 12/2016 | | |
| WO | WO 2017001891 | 1/2017 | | |
| WO | WO 2017085594 | 5/2017 | | |
| WO | WO 2018142343 | 8/2018 | | |
| WO | WO 2018142351 | 8/2018 | | |
| WO | WO 2018226617 | 12/2018 | | |
| WO | WO 2020118420 | 6/2020 | | |
| WO | WO 2021 210 989 A1 | * | 10/2021 | ............... F23J 15/00 |
| ZA | 201201141 | 10/2012 | | |

OTHER PUBLICATIONS

U.S. Appl. No. 17/118,115, filed Dec. 10, 2020, Al-Rowaili et al.
U.S. Appl. No. 17/140,258, filed Jan. 4, 2021, Younes et al.
U.S. Appl. No. 17/140,274, filed Jan. 4, 2021, Younes et al.
U.S. Appl. No. 61/562,189, filed Nov. 21, 2011, Lee et al.
Abbassi et al., "Efficiency improvements in production profiling using ultracompact flow array sensing technology," Petrophysics, Aug. 2018, 59:4 (457-488), 32 pages.
Abrams, "Electrolytic polishing of copper and nickel silver" 1965, 104 pages.
Alvarez et al., "Ru—Ni catalyst in the combined dry-stream reforming of methane: the importance in the metal order addition," Topics in Catalysts, Jul. 2015, 59(2):303-313, 11 pages.
Amo et al., "Low-Quality Natural Gas Sulfur Removal/Recovery," Membrane Technology and Research, DOE Report DE-AC21-92MC28133—01, Jan. 29, 1998, 107 pages.
An et al., "Morphology control of Co2C nanostructures via the reduction process for direct production of lower olefins from syngas," Journal of Catalysis, Oct. 2018, 366:289-99, 11 pages.
Arora and Prasad, "An overview on dry reforming of methane: strategies to reduce carbonaceous deactivation of catalysts," RSC Adv., 2016, 6:108668, 21 pages.
Aschoundong et al., "Silane Modification of Cellulose Acetate Dense Films as Materials for Acid Gas Removal Macromolecules," Macromolecules, Jul. 9, 2013, 46:14, 11 pages.
Awad et al., "Removal of tarnishing and roughness of copper surface by electropolishing treatment" Applied Surface Science 256.13, Apr. 2010, 4370-4375, 6 pages.
Belov et al., "Gas transport and free volume in hexafluoropropylene polymers," Journal of Membrane Science, Nov. 2011, 383, 8 pages.
Berenschot, "Oxygen synergy for hydrogen production" TESN118016—Waterstofversneller, Dec. 2019, 97 pages.
Bernardo et al., "Gas transport properties of Pebax/room temperature ionic liquid gel membranes," Separation and Purification Technology, Sep. 2012, 97, 10 pages.
Bhide et al., "Hybrid processes for the removal of acid gases from natural gas," Journal of Membrane Science, Mar. 4, 1998, 140:1, 2 pages, Abstract Only.
Boeltken et al., "Ultra-compact microstructured methane steam reformer with integrated Palladium membrane for on-site production of pure hydrogen: Experimental demonstration," International Journal of Hydrogen Energy, Elsevier Science Publishers, Jul. 2014, 39(31):18058-18068, 11 pages.
Chandler, "Getting more heat out of sunlight," Phys Org, Jul. 2019, 3 pages.
Chatterjee et al., "Poly(ether urethane) and poly(ether urethane urea) membranes with high $H_2S/CH_4$ selectivity," Journal of Membrane Science, Nov. 1997, 135:99, 8 pages.
Chen et al., "Electrochemical reduction of carbon dioxide to ethane using nanostructured Cu2O-derived copper catalyst and palladium (II) chloride" The Journal of Physical Chemistry C. 119.48, Dec. 2015, 26875-26882, 8 pages.
Chen et al., "Hydrogen production from the steam reforming of liquid hydrocarbons in membrane reactor," Catalysis Today, Elsevier, Oct. 2006, 118(1-2):136-143, 8 pages.
Chu et al., "Negatively Thermoresponsive Membranes with Functional Gates Driven by Zipper-Type Hydrogen-Bonding Interactions," Angew. Chem. Int. Ed., 2005, 44:2124-2127, 4 pages.
Cimino, "Deploying a solar hybrid technology in a remote oil and gas production site," Journal of the Japan Institute of Energy, Jan. 2015, 94:1163-1168, 7 pages.
Desouza et al., "Portable Emission Measurement System (PEMS) Testing of a 100KVA Generator using Red Diesel and ISO grade Diesel," King's College London, Environmental Research Group, Dec. 2016, 12 pages.

(56) References Cited

OTHER PUBLICATIONS

Er-rbib et al., "Dry reforming of methane—review of feasibility studies," Chemical Engineering Transactions, 2012, 29:163-168, 7 pages.
Esposito, "Membraneless electrolyzers for low-cost hydrogen production in a renewable energy future" Joule 1.4, Dec. 2017, 651-658, 8 pages.
explainthatstuff.com [online], ""Smart" windows (electrochromic glass)," available on or before Jul. 20, 2011, via Internet Archive: Wayback Machine URL <https://web.archive.org/web/20110720100002/https://www.explainthatstuff.com/electrochromic-windows.html>, retrieved on Oct. 8, 2020, URL <https://www.explainthatstuff.com/electrochromic-windows.html>, 7 pages.
Fakeeha et al., "Effect of changing CH4/CO2 ratio on hydrogen production by dry reforming reaction," 16th WHEC, Jun. 13-16, 2006, 1:245-256, 12 pages.
Fasihi et al., "Techno-economic assessment of CO2 direct air capture plants," Journal of Cleaner Production, Mar. 2019, 224: 957-980, 24 pages.
FuelCell Energy "Air Products and FuelCell Energy Begin Construction of High Efficiency Hydrogen Energy Station Demonstration for Combined Hydrogen, Electricity and Heat Generation," System Designed to Address Industrial and Transportation Applications, Mar. 2007, 5 pages.
Gamry.com [online], "Two Three and Four Electrode Experiments" available on or before Sep. 19, 2020, via internet Archive : Wayback Machine URL <https://web.archive.org/web/20200919155301/https://www.gamry.com/application-notes/instrumentation/two-three-four-electrode-experiments/>, retrieved on Jan. 3, 2022, URL <https://www.gamry.com/application-notes/instrumentation/two-three-four-electrode-experiments/>, 5 pages.
Goeppert et al., "Air as the renewable carbon source of the future: an overview of CO2 capture from the atmosphere," Energy Environ. Sci., 2012, 5, 7833, 21 pages.
Homerenergy.com[online], "Homer Pro 3.14" Jun. 19, 2020, [retrieved on Dec. 28, 2020], retrieved from : URL <https://www.homerenergy.com/products/pro/docs/latest/how_homer_creates_the_generator_efficiency_curve.html>, 1 page.
Husain et al., "A review of transparent solar photovoltaic technologies," Renewable and Sustainable Energy Reviews, 2018, 94:779-791, 13 pages.
Ibrahim et al., "Dry reforming of methane using Ce-modified Ni supported on 8% PO4 +ZrO2 catalysts," Catalysts, 2020, 10:242, 16 pages.
Iea, "Putting CO2 to Use: Creating value from emissions," Sep. 2019, 86 pages.
iea.org [online], "Putting CO2 to Use," IEA, Sep. 2019, 14 pages.
Jafarbegloo et al., "One-pot synthesis of NiO—MgO nanocatalysts for CO2 reforming of methane: The influence of active metal content on catalytic performance," Journal of Natural Gas Science and Engineering 2015, 27:2 (1165-1173), 23 pages.
Jansen et al., "On the unusual solvent and the effect on the gas transport in perfluorinated Hyflon AD Membranes," Journal of Membrane Science, Jan. 2007, 287:1, 6 pages.
Kang et al., "Effect of copper surface morphology on grain size uniformity of graphene grown by chemical vapor deposition," Current Applied Physics 2019, 19.12:1414-1420, 7 pages.
Keith et al., "A Process for Capturing CO2 from the Atmosphere," Joule, Aug. 2018, 2: 1-20.
Kim et al., "Methanol synthesis from syngas over supported palladium catalysts prepared using water-in-oil microemulsion," Applied Catalysis A: General, 1998, 169:157-64, 8 pages.
Knipe et al., "CO2 Absorption and Regeneration Cycling with Micro-Encapsulated CO2 Sorbents," Environmental Science & Technology, Feb. 2018, 24 pages.
Kraftschik et al., "Dense film polyimide membranes for aggressive sour gas feed separations," Journal of Membrane Science, Feb. 1, 2013, 428, 12 pages.

Kwon et al., "Controlled electropolishing of copper foils at elevated temperature." Applied surface science 307, Jul. 2014, 731-735, 5 pages.
Lallemand et al., "Extending the treatment of highly sour gases: cryogenic distillation," Digital Refining: Processing, Operations & Maintenance, Jan. 2014, 8 pages.
Lallemand et al., "Highly sour gas processing: Bulk removal with SPREX Process," IPTC-10581-MS, International Petroleum Technology Conference, Nov. 2005, 18 pages.
Lallemand et al., "Solutions for the treatment of highly sour gases," Digital Refinding: Processing, Operations & Maintenance, Apr. 2012, 14 pages.
Lavoie, "Review on dry reforming of methane, a potentially more environmentally friendly approach to increasing natural gas exploitation," Frontier in Chemistry, Nov. 2014, 2:81, 17 pages.
Leo, "Tri-Generation Fuel Cells: Opening Doors to Distributed Hydrogen Markets," CryoGas International, Jul. 2016, 3 pages.
Lockhart, "Sour oil and gas management: 3.3," vol. Lii/New Developments: Energy, Transport, Sustainability Encyclopedia of Hydrocarbons, 2007, 34 pages.
Lokhandwala et al., "Membrane separation of nitrogen from natural gas: A case study from membrane synthesis to commercial deployment," Journal of Membrane Science, Jan. 2010, 346, 10 pages.
Malico et al., "Design of a trigeneration system using a high-temperature fuel cell," International journal of energy research, Special Issue: The changing energy paradigm, challenges and new developments, Feb. 2009, 33:2 (144-151), 8 pages.
Manliclic et al., "Tri-Generation Fuel Cell Technologies for Location-Specific Applications," AN047, Advanced Power and Energy Program, Jun. 17, 2014, 19 pages.
Merkel and Toy, "Comparison of Hydrogen Sulfide Transport Properties in Fluorinated and Nonfluorinated Polymers," Macromolecules, Sep. 2006, 39:22, 10 pages.
Milanov et al., "Dry Reforming of Methane with CO2 at Elevated Pressures," New Technologies and Alternative Feedstocks in Petrochemistry and Refining DGMK Conference Oct. 9-11, 2013, 5 pages.
Mogensen et al., "Methane Steam Reforming over an Ni-YSZ Solid Oxide Fuel Cell Anode in Stack Configuration," Journal of Chemistry, 2014, Article ID 710391, 9 pages.
Mori et al., "Reactor configuration and concentration polarization in methane steam reforming by a membrane reactor with a highly hydrogen-permeable membrane," Industrial & Engineering Chemistry Research, Feb. 2007, 46:7 (1952-1958), 7 pages.
Oi et al., "Simulation and cost comparison of CO2 liquefaction," Energy Procedia, 2016, 86:500-510, 11 pages.
Olah et al., "Single step Bi-reforming and oxidative Bi-reforming of methane (Natural gas) with Steam and Carbon dioxide to Metgas for methanol synthesis," ACS publications, 2015, 18 pages.
Park et al., "Reversible Self-Actuated Thermo-Responsive Pore Membrane," Scientific Report, Dec. 2016, 10 pages.
Perez-Fortes et al., "Design of a Pilot SOFC System for the Combined Production of Hydrogen and Electricity under Refueling Station Requirements," Fuel Cells, 2019, 19:4 (389-407), 19 pages.
Pitchaimani et al., "Manufacturable plastic microfluidic valves using thermal actuation," Lab on a Chip, Aug. 2009, 9:21 (3082-3087), 6 pages.
Qin et al., "Roughness of copper substrate on three-dimensional tin electrode for electrochemical reduction of CO2 into HCOOH," Journal of $CO_2$ Utilization, 2017, 21:219-223, 5 pages.
Ramos et al., "Hybrid photovoltaic-thermal solar systems for combined heating, cooling and power provision in the urban environment," Energy Conversion and Management, 2017, 150:838-850, 13 pages.
Robeson, "The upper bound revisited," Journal of Membrane Science, 320, Jul. 15, 2008, 11 pages.
Rufford et al., "The removal of CO2 and N2 from natural gas: A review of conventional and emerging process technologies," Journal of Petroleum Science and Engineering, Sep. 2012, 94-95, 32 pages.

(56) References Cited

OTHER PUBLICATIONS

Schakel et al., Assessing the techno-environmental performance of CO2 utilization via dry reforming of methane for the production of dimethyl ether,: Journal of CO2 utilization, Dec. 2016,16:138-149, 12 pages.

Schulz et al., "Dry Reforming of Methane at Elevated Pressures," New Technologies and Alternative Feedstocks in Petrochemistry and Refining DGMK Conference Oct. 9-11, 2013, Dresden, Germany, DGMK-Tagungsbericht Feb. 2013, 1 page.

Shaffer et al., "Desalination and Reuse of High-Salinity Shale Gas Produced Water: Drivers, Technologies, and Future Directions," Environ. Sci. Technol., Jul. 2013, 15 pages.

Shi et al., "An Introduction of CO2 Conversion by Dry Reforming with Methane and New Route of Low-Temperature Methanol Synthesis," Accounts of Chemical Research. 2013, 46:1838-47, 10 pages.

Shojaeddini, "Oil and gas company strategies regarding the energy transition," Progress in Energy, 01:2001, 2019, 20 pages.

Su et al., "Syngas to light olefins conversion with high olefin/paraffin ratio using ZnCrOx/AlPO-18 bifunctional catalysts," Nature Communications, Mar. 2019, 10:1, 8 pages.

Uemoto et al., "Electrochemical Carbon Dioxide Reduction in Methanol at Cu and Cu2O-Deposited Carbon Black Electrodes," ChemEngineering 3.1:15, 2019, 10 pages.

Vericella et al., "Encapsulated liquid sorbents for carbon dioxide capture," Nature Communications, Feb. 2015, 7 pages.

Wang et al., "CO2 capture by solid adsorbents and their application: current status and new trends," Energy & Environmental Science, 2011, 4:42-55, 14 pages.

Wang et al., "One-step synthesis of dimethyl ether from syngas on ordered mesoporous copper incorporated alumina," Journal of Energy Chemistry, Sep. 2016, 5:775-81, 7 pages.

Wang, "Electrolytic Coloring of Copper," Diandu Yu Huanbao, 8:5 (10-11), 1988, 1 page (English Abstract Only).

Weiss et al., "Coking of Oil Sands, Asphaltenes and Residual Oils in the LR-Process," Unitar Conference, Aug. 9, 1988, 23 pages.

Wen et al., "Metal-organic frameworks for environmental applications," Cell Reports, Physical Science, 2:100348, Feb. 24, 2021, 17 pages.

Wismann et al., "Electrified methane reforming: A compact approach to greener industrial hydrogen production," Science Magazine, May 2019, 364:6442 (756-759), 12 pages.

Wolfbeisser et al., "Methane dry reforming over ceria-zirconia supported Ni catalysts," Catal Today, Nov. 15, 2016, 277:2, 12 pages.

Xu et al., "An Improved CO2 Separation and Purification System Based on Cryogenic Separation and Distillation Theory," Energies ISSN 1996-1073, May 2014, 7: 3484-3502.

Yu et al., "Combined Hydrogen, Heat and Power (CHHP) pilot plant design," International Journal of Hydrogen Energy, Apr. 22, 2013, 38:12 (4881-4888), 8 pages.

Zhang et al., "Coke-resistant Ni@SiO2 catalyst for dry reforming of methane," Applied Catalysis B: Environmental, Oct. 2015, 176-177: 513-521, 9 pages.

Zhang et al., "Techno-economic comparison of green ammonia production processes" Applied Energy 259, Feb. 2020, 12 pages.

Zhao et al., "Harnessing Heat Beyond 200° C from Unconcentrated Sunlight with Nonevacuated Transparent Aerogels," ACS Nano, Jun. 2019, 3(7):7508-7516, 9 pages.

* cited by examiner

METHOD FOR CAPTURING CO2 WITH ASSISTED VAPOR COMPRESSION

TECHNICAL FIELD

This disclosure relates to methods and systems for direct capture of $CO_2$ from gaseous streams such as air. In particular, the disclosure related to methods and systems using vapor compression to recover heat needed for generated steam used during desorption of $CO_2$ from a sorbent material.

BACKGROUND

With the rising concerns of increasing $CO_2$ emissions and the resultant global warming and related climate changes, governments and companies around the world are looking for ways to reduce their energy intensity and carbon footprint. One way to reduce $CO_2$ emissions is to use renewable energy sources, such as solar, wind, and geothermal energy sources. However, despite decreasing costs of "green" energy from renewable sources, the amount of energy generated from all such sources combined is insufficient to satisfy the growing global demand for energy, and the anthropogenic $CO_2$ emissions continue to rise, adding billions of tons of $CO_2$ to the atmosphere every year. Hence, another way to reduce $CO_2$ emissions is direct capture of $CO_2$ from the atmosphere followed by carbon sequestration and use, for example, in the form of a biofuel, or by production of dry ice or graphene. Much effort has been focused on trapping $CO_2$ at its release point, such as from a power plant flue gas or an exhaust stream, where $CO_2$ is most concentrated. But such systems do not address the rising $CO_2$ emissions from transportation sector, such as aviation and automobiles, where direct capture is either impossible, impractical, or prohibitively expensive. To reduce emissions from the transportation sector, which account for nearly 30% of all greenhouse gas emissions, $CO_2$ must be captured directly from ambient atmospheric air, where it is least concentrated. Current systems for capturing $CO_2$ directly from atmosphere include liquid absorbents and solid adsorbents for selectively capturing and concentrating $CO_2$ from a stream of air. Many such sorbent systems utilize a chemical reagent, such as an amine-based reagent, that selectively reacts with $CO_2$ as opposed to all the other gases contained in the air (such as $O_2$, $N_2$, Ar, $CH_4$, or $H_2O$). But because average $CO_2$ concentration in atmosphere is only about 0.06 wt. %, economically efficient direct air capture is a formidable challenge.

SUMMARY

The present disclosure provides processes and systems for capturing and concentrating $CO_2$ from a $CO_2$-containing stream, such as ambient air. The disclosure is based, at least in part, on a realization that adding a vapor-compression cycle to a solid sorbent-based direct capture system increases the process economic efficiency and further increases the production rate of $CO_2$. In addition, the addition of the vapor compression cycle decreases the process time, allowing the use of smaller equipment operated at a lesser cost to maintain the same production rate when compared to a similar direct capture process that does not include a vapor-compression cycle. In the inventive process and system of the instant disclosure, a $CO_2$ containing stream is circulated through a sorbent material that would adsorb the $CO_2$ in the capture mode. The sorbent material is then regenerated at high temperature under a high flow of steam (water vapor) to drive $CO_2$ desorption from the sorbent material into the water vapor stream. The mixed $CO_2$—steam stream is then subjected to a vapor compression cycle, which allows to efficiently separate the $CO_2$ from steam by condensing the steam to liquid water, to recirculate the condensed liquid water into the process as steam, and to use the heat produced during the condensation of water to generate the steam for $CO_2$ desorption. Since the heat is recycled throughout the process, it requires reduced energy input once the system is in its operating condition. The only substantial cost required for the efficient operation of the inventive system is the cost of electrical energy to operate a compressor. When coupled with a renewable energy source, such as solar panels, to provide electricity, the system allows to capture $CO_2$ from air in a "green" manner, without producing any carbon footprint. In addition, considering the simplicity of the heat recovery cycle in the instant process, the system can be assembled and operated even in remote locations, especially those locations where $CO_2$ is needed for carbon sequestration purposes.

In one general aspect, the present disclosure provides a method of capturing $CO_2$ from a $CO_2$-enriched gaseous stream, the method including the following steps (i)-(vi):

(i) contacting the $CO_2$-enriched gaseous stream with a $CO_2$-depleted sorbent material at about ambient temperature and at about ambient pressure, to produce a $CO_2$-depleted gaseous stream and a $CO_2$-enriched sorbent material;

(ii) contacting the $CO_2$-enriched sorbent material produced in step (i) with a stream of steam at a first pressure and a first temperature, to produce the $CO_2$-depleted sorbent material and a $CO_2$-enriched stream of steam;

wherein the first temperature is greater than the ambient temperature, and the first pressure is equal or below the saturation pressure corresponding to the first temperature;

(iii) compressing the $CO_2$-enriched stream of steam produced in step (ii) to a second pressure and a second temperature, to produce a hot compressed $CO_2$-enriched stream of steam;

wherein the second temperature is greater than the first temperature, and the second pressure is greater than the first pressure;

(iv) condensing the hot compressed $CO_2$-enriched stream of steam produced in step (iii) to produce a stream of gaseous $CO_2$ at about a third temperature, a stream of water at about the first pressure and a fourth temperature, and an amount of a thermal energy;

wherein the second temperature is greater than the third temperature and the fourth temperature, and the first temperature is greater than or about equal to the fourth temperature;

(v) heating the stream of water produced in step (iv) to produce the stream of steam at the first pressure and the first temperature for use in step (ii) using the thermal energy produced in step (iv); and (vi) contacting the $CO_2$-enriched sorbent material produced in step (i) with the stream of gaseous $CO_2$ produced in step (iv) to produce a stream of gaseous $CO_2$ at a fifth temperature and the $CO_2$-enriched sorbent material produced in step (i) at a temperature lower than or equal to the first temperature for use in step (ii);

wherein the fifth temperature is lower than the third temperature.

In some embodiments, the process may also include using the stream of liquid water at the fifth temperature to cool the $CO_2$-depleted sorbent material produced in step (ii) from about the first temperature to about the fifth temperature.

In some embodiments, the $CO_2$-enriched gaseous stream is ambient air.

In some embodiments, the ambient air comprises from about 200 ppm to about 1000 ppm of $CO_2$.

In some embodiments, the $CO_2$-enriched gaseous stream is flue gas.

In some embodiments, the flue gas comprises from about 3 vol. % to about 35 vol. % of $CO_2$.

In some embodiments, the $CO_2$-depleted sorbent material is a liquid based sorbent.

In some embodiments, the $CO_2$-depleted sorbent material is a solid sorbent.

In some embodiments, the solid sorbent is selected from an amine compound on a solid support, a zeolite, activated carbon, a metal-organic framework.

In some embodiments, the $CO_2$-depleted sorbent material is hydrophobic.

In some embodiments, the $CO_2$-depleted sorbent material adsorbs water.

In some embodiments, the adsorption capacity of the $CO_2$-depleted sorbent material is from about 5 mg $CO_2$ to about 500 mg per about 1 g of sorbent material.

In some embodiments, $CO_2$ capture rate in step (i) is from about 50 wt. % to about 100 wt. % relative to the initial amount of $CO_2$ in the $CO_2$ enriched gaseous stream.

In some embodiments, the first pressure of the stream of steam in step (ii) is from about 0.5 bar to about 2 bar, and the first temperature of the stream of steam in step (ii) is from about 80° C. to about 200° C.

In some embodiments, molar ratio of water to $CO_2$ in the $CO_2$-enriched stream of steam produced in step (ii) is from about 50:1 to about 500:1.

In some embodiments, a ratio of the second pressure to the first pressure is from about 1.01:1 to about 100:1.

In some embodiments:
the second pressure is about 1.5 bar and the first pressure is about 1 bar, and
the second temperature is about 145° C. and the first temperature is about 100° C.

In some embodiments, from about 50 wt. % to about 100 wt. % of steam is condensed during condensing the hot compressed $CO_2$-enriched stream of steam in process (iv).

In some embodiments, the method includes decompressing an initially formed stream of water at the second pressure in step (iv) to form the stream of water at about the first pressure and the fourth temperature.

In some embodiments, the method is carried out in a batch mode or in a continuous mode.

Unless otherwise defined, all technical and scientific terms used herein have the same meaning as commonly understood by one of ordinary skill in the art to which the present application belongs. Methods and materials are described herein for use in the present application; other, suitable methods and materials known in the art can also be used. The materials, methods, and examples are illustrative only and not intended to be limiting. All publications, patent applications, patents, sequences, database entries, and other references mentioned herein are incorporated by reference in their entirety. In case of conflict, the present specification, including definitions, will control. Other features and advantages of the present application will be apparent from the following detailed description and figures, and from the claims.

DETAILED DESCRIPTION

In one general aspect, the present disclosure provides an adsorption-based $CO_2$ capture process. Generally, in such a process, the sorbent goes through four distinct phases. In phase I, a sorbent material is used to capture $CO_2$ from a $CO_2$-enriched gaseous stream, such as ambient air or flue gas. In phase II, the $CO_2$-enriched sorbent material is heated to reach the $CO_2$ desorption conditions. Then, in phase III, the material is heated to desorb $CO_2$ and regenerate the sorbent material. The phase III process may be carried out by blowing steam through the bed of the $CO_2$-enriched sorbent. The steam provides sufficient heat for the desorption to take place, and also serves as a sweeping force to carry $CO_2$ away from the surface of the sorbent material. In this phase, after all or nearly all of the $CO_2$ is desorbed, steam may be condensed to liquid water, and the liquid water separated from gaseous $CO_2$, for example, in a phase separator. Finally, in phase IV, the regenerated sorbent is cooled to its initial temperature, to be reused in phase I of the same process.

Conventionally, all four phases of such a process required a large amount of thermal energy, for example, to generate steam and to heat the $CO_2$-enriched sorbent to the required temperature for desorption. That thermal energy is usually lost with the waste water resulting from condensation of the steam to separate the concentrated $CO_2$ gas.

The methods and systems of the present disclosure advantageously allow to recover heat lost during cooling of regenerated sorbent in phase IV and use that heat to warm up the $CO_2$-enriched sorbent in phase II. These methods and systems also allow to recover heat from steam condensation and use that heat to evaporate liquid water to produce hot steam for use in the desorption process of phase III.

Figure 2:
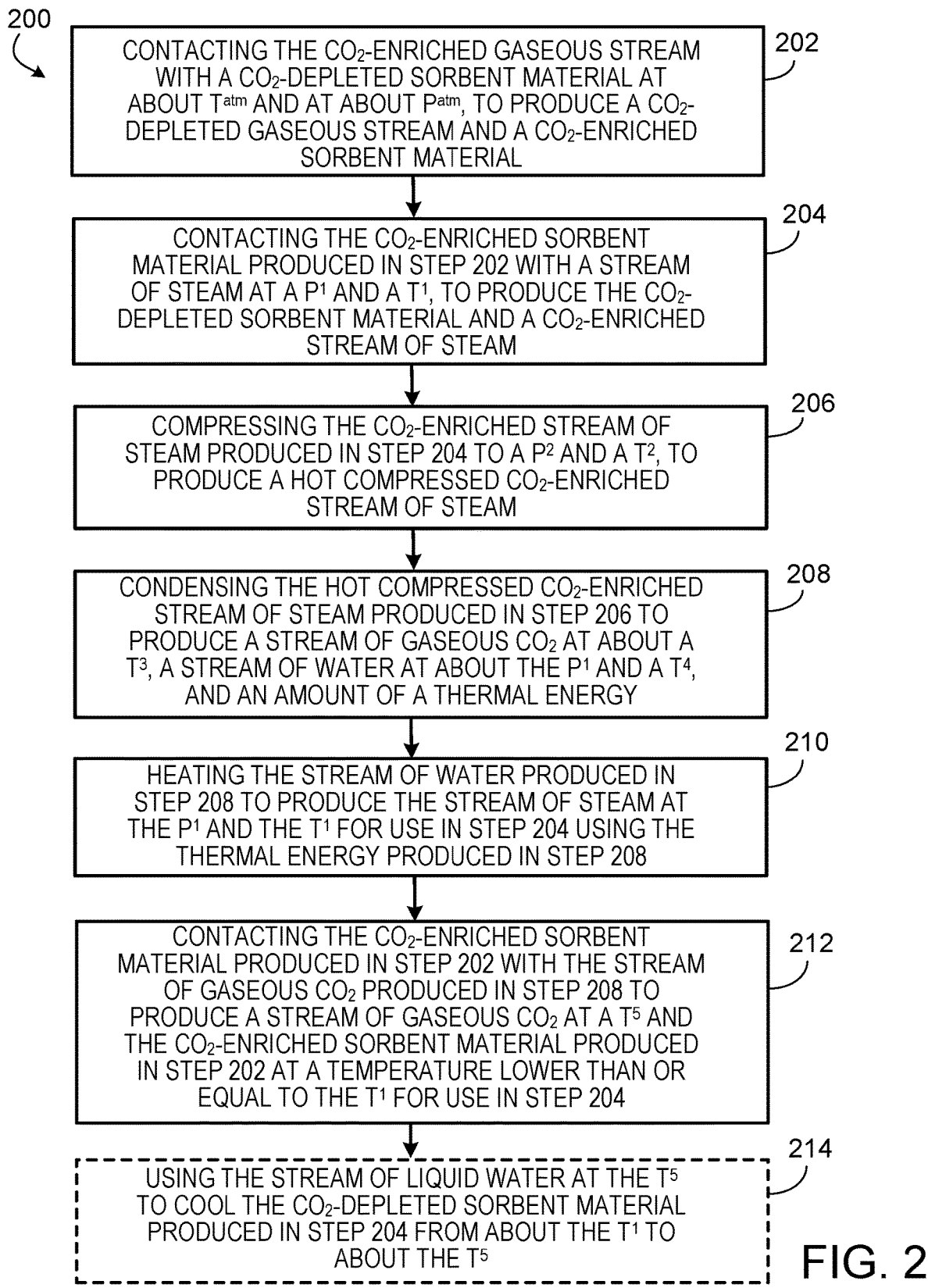
FIG. 2 is a flow chart detailing an exemplary process of the present disclosure.

In some embodiments, the present disclosure provides a method of capturing $CO_2$ from a $CO_2$-enriched gaseous stream. An exemplary process 200 within the present claims is schematically shown on FIG. 2. Referring to FIG. 2, the process 200 includes step 202 of contacting the $CO_2$-enriched gaseous stream with a $CO_2$-depleted sorbent material at about ambient temperature ($T^{atm}$) and at about ambient pressure ($P^{atm}$), to produce a $CO_2$-depleted gaseous stream and a $CO_2$-enriched sorbent material. Step 204 of the process includes contacting the $CO_2$-enriched sorbent material produced in step 202 with a stream of steam at a first pressure ($P^1$) and a first temperature ($T^1$), to produce the $CO_2$-depleted sorbent material and a $CO_2$-enriched stream of steam. In some embodiments, the $T^1$ is greater than the $T^{atm}$, and the $P^1$ is equal or below the saturation pressure corresponding to $T^1$. Step 204 of the process 200 is followed by step 206, which includes compressing the $CO_2$-enriched stream of steam produced in step 204 to a second pressure ($P^2$) and a second temperature ($T^2$), to produce a hot compressed $CO_2$-enriched stream of steam. In some embodiments, the $T^2$ is greater than the $T^1$, and the $P^2$ is greater than the $P^1$. Step 208 of the process 200 includes condensing the hot compressed $CO_2$-enriched stream of steam produced in step 206 to produce a stream of gaseous $CO_2$ at about a third temperature ($T^3$), a stream of water at about the $P^1$ and a fourth temperature ($T^4$), and an amount of a thermal energy. In some embodiments of the process 200, the $T^2$ is greater than the $T^3$ and the $T^4$, and the $T^1$ is greater than or about equal to the $T^4$. The process 200 further includes a step 210 of heating the stream of water produced in step 208 to produce the stream of steam at the $P^1$ and the $T^1$ for use in step 204, using the thermal energy produced in step 208. Finally, the process 200 also includes the step 212 of contacting the $CO_2$-enriched sorbent material produced in step 202 with the stream of gaseous $CO_2$ produced in step 208 to produce a stream of gaseous $CO_2$ at a $T^5$ and the $CO_2$-enriched sorbent material produced in step 202 at a temperature lower than or equal to the $T^1$ for use in step 204. In some embodiments, the $T^5$ is lower than the $T^3$.

In some embodiments, the process 200 may also include a step 214 which includes using the stream of liquid water at the $T^5$ to cool the $CO_2$-depleted sorbent material produced in step 204 from about the $T^1$ to about the $T^5$. In this process, the liquid water may be warmed up from the $T^5$ to a temperature lower than or about equal to the $T^1$.

In some embodiments, the process 200 may also include a step 214 which includes using the stream of gaseous $CO_2$ at the $T^5$ to cool the $CO_2$-depleted sorbent material produced in step 204 from about the $T^1$ to about the $T^{atm}$ (or $T^5$). In this process, the pure gaseous $CO_2$ may be warmed up from the $T^5$ to a temperature lower than or about equal to the $T^1$.

Certain embodiments of this process are described herein. As used throughout this disclosure, the term "about" means "approximately" (e.g., plus or minus approximately 10% of the indicated value).

The $CO_2$-enriched gaseous stream maybe any gas or a mixture of gases containing a removable amount of $CO_2$. One example of such a stream is air. Generally, ambient atmospheric air contains from about 200 to about 1000 ppm of $CO_2$. In some embodiments, the ambient air useful in the processes of this disclosure contains $CO_2$ in an amount of about 250 ppm, about 300 ppm, about 350 ppm, about 400 ppm, or about 1000 ppm. The air typically contains other gases besides $CO_2$, for example, the air may contain from about 20 v. % to about 22 v. % of $O_2$, from about 77 v. % to about 79 v. % of $N_2$, from about 0.5 v. % to about 1 v. % of Ar, as well as minor amounts of $H_2O$, CO, $CH_4$, and other gases. Another example of the $CO_2$-enriched stream is a flue gas. Such a flue gas may contain from about 3 v. % to about 35 v. % of $CO_2$, as well as $H_2O$, $NO_2$, $SO_2$, and the other gases that the air contains or that are produced during burning of fossil fuels. For example, $CO_2$-enriched gaseous stream may contain about 1 v. %, about 2 v. %, about 5 v. %, about 10 v. %, about 15 v. %, about 20 v. %, or about 25 v. % of $CO_2$.

The $CO_2$-depleted sorbent material may be any material that is substantially free of $CO_2$ and that has the capacity and ability to selectively adsorb $CO_2$ on its surface when that surface is brought in contact with a gaseous stream containing the $CO_2$. Examples of sorbent material include solid sorbents and liquid based sorbents. Examples of liquid based sorbents include various liquids incorporating solid sorbents by means of suspension or encapsulation for example. Suitable examples of solid sorbents include amine compounds on a solid support, zeolites, activated carbon, metal-organic frameworks. In some embodiments, the solid sorbent is a chemisorbent, selectively and reversibly chemically reacting with $CO_2$, forming a new chemical compound such as an organic amide or a carbamate, or organic and inorganic carbonates. In other embodiments, the solid sorbent is a physisorbent that adsorbs $CO_2$ non-covalently, for example, by forming H-bonding, hydrophobic interaction, electrostatic interactions, or Van der Waals forces between the surface of the adsorbent and the molecules of $CO_2$. The physisorbents are typically materials with high porosity having a very large surface area, allowing for physical reversible adhesion of a large amount of molecules of $CO_2$ on the surface.

In some embodiments, the solid sorbent material is hydrophobic. In one example, the contact angle of a water drop on the surface of the solid sorbent is greater than about 90 deg, about 100 deg, about 120 deg, or about 150 deg. In these embodiments, the sorbent material in tower 114 (referring to FIG. 1) in phase IV of the process is substantially free from water. Any water that remained after sweep steaming the $CO_2$-enriched adsorbent drips down from the sorbent bed, leaving behind substantially dry material. In other embodiments, the sorbent material is prone to water capture, having an ability to adsorb a substantial amount of water. In one example, the water adsorbing sorbent may adsorb about 5 wt. %, about 10 wt. %, about 15 wt. %, or about 20 wt. % of water relative to the weight of the dry sorbent material.

In some embodiments, the $CO_2$-depleted sorbent material in step 202 of the process 200 has the ability to adsorb from about 5 mg $CO_2$ to about 500 mg per about 1 g of sorbent material. In one example, the adsorption capacity of the sorbent material is about 40 mg, about 60 mg, about 80 mg, about 100 mg, or about 200 mg of $CO_2$ per about 1 g of the sorbent material.

To contact the depleted sorbent with the stream containing $CO_2$ in the step 202 of the process 200, the stream can be blown through a single tower or a plurality of towers. A tower containing sorbent beds may be constructed such that the air/gas flow rate is from about 1 $m^3$/hour to about 100,000 $m^3$/hour, for example, about 100 $m^3$/hour, about 1000 $m^3$/hour, about 10,000 $m^3$/hour, about 20,000 $m^3$/hour, about 30,000 $m^3$/hour, or about 50,000 $m^3$/hour.

The step 202 of the process 200 may be carried out such that the capture rate of $CO_2$ from the enriched stream is from about 1% to about 100%. For example, the capture rate may be from about 40% to about 100%, from about 50% to about 99%, from about 60% to about 95%, or from about 85% to about 95% of the total amount of $CO_2$ in the enriched stream (e.g., air). In some embodiments, the capture rate is about 50%, about 60%, about 85%, about 95%, or about 99%. In one example, $CO_2$ depleted stream exiting the step 202 contains the initial amount $CO_2$ less the captured $CO_2$. In this example, an amount of $CO_2$ in the depleted stream is from about 1% to about 50%, from about 1% to about 25%, or from about 1% to about 10% of the initial amount of $CO_2$ in the enriched stream entering the process 200. In some embodiments, the depleted stream is substantially free from $CO_2$.

In some embodiments, the $CO_2$ enriched sorbent material generated in the step 202 of the process 200 contains about 10×, about 100×, about 1,000×, about 10,000×, or about 100,000× the amount of $CO_2$ initially contained in the $CO_2$ depleted sorbent material entering the process. In one example, the $CO_2$ enriched sorbent material is saturated with $CO_2$. That is, the sorbent material comprises from about 5 mg $CO_2$ to about 500 mg per about 1 g of sorbent material (e.g., as described above). In some embodiments, the $CO_2$ enriched sorbent material comprises from about 5 wt. % to about 25 wt. % of $CO_2$ relative to the weight of the initial $CO_2$ depleted material.

In some embodiments, the step 202 of the process 200 is carried out at about $T^{atm}$. That is, the $CO_2$-enriched gaseous stream, such as air, is at about ambient temperature, and the $CO_2$-depleted sorbent material is at about ambient temperature during the contacting. An example of ambient temperature is a temperature from about −15° C. to about 60° C., such as about 15° C., about 20° C., about 25° C., or about 35° C.

In some embodiments, the step 202 of the process 200 is carried out at about $P^{atm}$. That is, the gaseous stream and the sorbent material during the contacting are handled at about normal atmospheric pressure. An example of ambient pressure is a pressure from about 0.7 bar to about 1.5 bar, such as about 0.95 bar, about 0.99 bar, about 1 bar, about 1.01 bar, about 1.02 bar, about 1.05 bar, and about 1.1 bar.

In order to desorb $CO_2$ from the enriched (or saturated) sorbent, such sorbent may be contacted with steam in step 204 of the process 200. The steam may be blown into a tower containing the $CO_2$-enriched sorbent at a pressure and temperature, and in an amount that is necessary for efficient desorption of $CO_2$ from the sorbent. In some embodiments, the steam is blown to a tower containing a bed or beds of enriched sorbent at a $P^1$ and a $T^1$. In some embodiments, the $T^1$ is greater than $T^{atm}$. In some embodiments, the $P^1$ is equal or below the saturation pressure corresponding to $T^1$. The steam may be saturated or superheated. When blown into the tower, it comes in direct contact with the sorbent material. Generally, the sorbent material prior to this process is warmed up to about $T^1$ during phase II of the process. The steam may also supply the heat necessary for desorption of $CO_2$ and may sweep $CO_2$ from the sorbent material.

In some embodiments, because the sorbent bed is brought to $T^1$ prior to steaming process, there is substantially no or minimal steam condensation in the adsorbent tower. The sorbent bed remains at $T^1$ throughout the process and even after the steaming operation has ended. Because $T^1$ is at or above the boiling point of water at $P^1$, no condensation occurs. In the case of hydrophobic sorbent material, the de minimis amount of condensed water is repelled by the material and flows freely out of the tower. In the case of water adsorbing material, the de minimis amount of condensed water is absorbed by the sorbent material, which becomes dry and water-free during the cooling operation in phase IV.

In some embodiments, the molar ratio of steam to $CO_2$ during the desorption process is from about 50:1 to about 500:1. In one example, the molar ratio of steam to $CO_2$ in the process is about 50:1, about 100:1, about 200:1, about 250:1, about 300:1, or about 400:1. The temperature of the sweeping steam ($T^1$) may be from about 80° C. to about 500° C., and the absolute pressure of the steam ($P^1$) may be from about 0.5 bar to about 40 bar. For example, the temperature $T^1$ of the steam is from about 100° C. to about 200° C., and the absolute pressure $P^1$ is from about 1 bar to about 2 bar. In some embodiments, the $T^1$ is about 100° C., about 110° C., about 120° C., about 130° C., about 135° C., about 140° C., about 145° C., about 150° C., about 155° C., or about 160° C. In some embodiments, the $P^1$ is about 0.7 bar, about 0.8 bar, about 0.9 bar, about 1 bar, about 1.1 bar, about 1.2 bar, about 1.5 bar, about 2 bar, about 5 bar, about 10 bar, or about 50 bar. In one example, $P^1$ is substantially equal to $P^{atm}$.

The $CO_2$-enriched stream of steam exits the step 204 to enter a compressor in step 206 of the process 200. In some embodiments, molar ratio of water vapor to $CO_2$ in the $CO_2$-enriched steam entering the compressor is from about 10:1 to about 2,000:1, from about 10:1 to about 1,500:1, from about 10:1 to about 1,000:1, from about 50:1 to about 400:1, or about 50:1 to about 500:1. In some embodiments, the molar ratio is about 50:1, about 100:1, about 150:1, about 200:1, about 250:1, about 300:1, about 400:1, or about 500:1. The $CO_2$-enriched steam exits the step 204 at about $T^1$ and at about $P^1$, and having the remaining physical characteristics similar to those of the sweeping steam. The compressor in the step 206 compresses the $CO_2$-enriched steam to a pressure $P^2$ that is greater than the pressure $P^1$. In some embodiments, the pressure ratio in across the compressor ($P^2/P^1$) is from about 1.01:1 to about 100:1, from about 1.05:1 to about 50:1, from about 1.1:1 to about 40:1, from about 1.2:1 to about 30:1, or from about 1.01:1 to about 20:1. As a consequence of the increased pressure, temperature of the steam mixture also rises from $T^1$ to $T^2$. In one example, when pressure $P^2$ is 1.2 bar (raised from $P^1$ pressure of 1 bar), $T^2$ raises to 120° C. (from $T^1$ of 100° C.). In some embodiments, $P^2$ is about 50 bar, about 40 bar, about 30 bar, about 20 bar, about 10 bar, about 5 bar, about 4 bar, about 3 bar, or about 2 bar. In some embodiments, $T^2$ is 110° C., about 120° C., about 130° C., about 135° C., about 140° C., about 150° C., about 175° C., about 200° C., about 220° C., about 250° C., about 300° C., about 400° C., or about 500° C. The compressor used to create the compressed $CO_2$-steam mixture at the pressure $P^2$ is any one of the compressors known to one of ordinary skill in the art for such purpose. For example, the compressor, such as compressor 118 (referring to FIG. 1) may be a centrifugal compressor, a diaphragm compressor, or an axial compressor, each of which may have one stage or multiple stages depending on compression ratio. In the case of a multistage compressor, intercoolers can be used to increase the compression efficiency.

The hot compressed $CO_2$-enriched stream of steam created in step 206 may then be condensed in step 208, for example, by contacting the stream with a colder surface of a heat exchanger to condense the gaseous steam to a liquid water. Thus, the steam on the hot side of the heat exchanger is converted to a stream containing a gaseous phase consisting mainly of $CO_2$ and a liquid water phase. In some embodiments, from about 50% to about 100% of steam is condensed in this process. In some embodiments, about 50%, about 60%, about 75%, about 80%, about 85%, about 90%, about 95%, about 99%, or about 100% of steam of the hot compressed mixture stream is condensed into liquid water in step 208. The liquid water produced in this process can have a pressure of about $P^1$ and a temperature of about $T^4$ that is lower than the $T^2$ of the condensing steam. In some embodiments, the liquid water produced in the process can have a pressure of about $P^2$ (which is subsequently expanded to $P^1$) and temperature of about $T^4$ that is lower than or about equal to the $T^2$ of the condensing stream. The gaseous phase produced in step 208 on the hot side of the heat exchanger consists mainly of desorbed $CO_2$ and any gaseous steam that was not converted to liquid water during the heat exchange and condensation of step 208. When the steam is condensing on the hot side on the exchanger, an amount of thermal energy (heat) is also produced. This heat is effectively transferred to the cooling liquid on the cold side of the heat exchanger, for example, during step 210 of the process 200.

The gas/liquid mixture form the hot side of the heat exchanger in the step 208 may then be transferred to a phase separator, where the stream of gaseous $CO_2$ at the pressure $P^2$ and temperature $T^3$ is separated from liquid water phase at pressure $P^2$ and temperature $T^4$. In some embodiments, $T^2$ is greater than $T^3$ and $T^4$. In some embodiments, $T^3$ is about equal to $T^4$. In some embodiments, $T^3$ is greater than $T^4$.

The liquid water produced in step 208 can then undergo decompression in an expansion device. Suitable examples of the expansion device include a throttling valve, a fixed orifice, and a turbine. The water is decompressed in this manner to the pressure $P^1$ (while remaining at or about the temperature $T^4$). In some embodiments, the pressure ratio ($P^1/P^2$) across the expansion device is the reverse of the pressure ratio formed in the compressor in step 206. For example, the pressure ratio across the expansion device ($P^2/P^1$) is from about 1.01:1 to about 100:1, from about 1.05:1 to about 50:1, from about 1.1:1 to about 40:1, from about 1.2:1 to about 30:1, or from about 1.01:1 to about 20:1.

In step 210, the decompressed liquid water produced in step 208 can be recycled and re-used in the same step 208 by serving as a cooling liquid for condensing the hot compressed steam. For example, the stream of water can be supplied to the cool side of the heat exchanger in step 208, where the water is evaporated and converted into steam at about pressure $P^1$ and at about temperature $T^1$. Stream of steam produced in this manner can then be used in phase III (step 204) of the process 200. Effectively, the same heat exchanger can be used in both steps 208 and 210. This heat exchanger generally has two sides (hot and cold) with two different pressures: the hot $P^2$ side where $CO_2$-enriched steam supplied at $T^2$ is condensing, and the cold $P^1$ side where liquid water at $P^1$ and about $T^4$ (e.g., liquid water produced in step 208) is being evaporated to produce the steam at $P^1$ and $T^1$, to be used for $CO_2$ desorption in step 204. In some embodiments, additional energy is needed to produce the required steam at $P^1$ and $T^1$; in such embodiments the additional energy can be brought by an external source of energy such as electrical heating, fuel combustion, geothermal energy or any other means of heating known to the person skilled in the art. The $\Delta(P^2-P^1)$ in this process can be set up in such a manner that the $P^2/T^2$ hot stream condensing temperature is from about 1° C. to about 50° C. higher than the $P^1/T^1$ liquid water evaporating temperature. In one example, the $\Delta(T^2-T^1)$ is from about 1° C. to about 40° C., from about 5° C. to about 50° C., from about 10° C. to about 50° C., or from about 20° C. to about 40° C. The pressurized steam condenses at higher temperature compared to the temperature of the evaporating liquid water, which enables direct heat transfer between the condensing steam and the evaporating fluid. Effectively, the entire amount of thermal energy (heat) produced during steam condensation is use to evaporate the same water that is formed during steam condensation.

The gaseous $CO_2$ stream is produced during phase separation in step 208 at the pressure $P^2$ and a temperature $T^3$ that is lower than or about equal to the temperature $T^2$ of the condensing steam. The heat of this stream can be used in step 212 for heating the tower containing $CO_2$-enriched sorbent material in phase II from $T^{atm}$ to a temperature between $T^{atm}$ and $T^1$ to prepare the sorbent for the sweeping steam desorption phase III. This may be accomplished by contacting the enriched sorbent material (kept at $T^{atm}$) with the gaseous $CO_2$ stream (having temperature $T^3$). The contacting may be carried out by the means of a heat exchanger, having $CO_2$ stream on the hot side and the enriched sorbent on the cold side. After exiting this heat exchanger, the gaseous $CO_2$ stream generally has a temperature $T^5$ that is lower than the $T^3$. For example, the temperature $T^3$ may be 125° C., while temperature $T^5$ may be from about 15° C. to about 50° C. In one example, the $T^5$ is about equal to $T^{atm}$. In another example, $T^5$ is slightly higher than $T^{atm}$.

The process 200 may also include a step 214, where the liquid water at $T^5$ can be used to cool the tower of regenerated sorbent in phase IV. In one embodiment, a $CO_2$ stream produced at $T^5$ can be used to cool the tower of regenerated sorbent in phase IV.

In one aspect, the process 200 may also include a step 216 (not shown) for when the $CO_2$ stream produced in step 208 after phase separation contains some steam (e.g., from about 5 wt. % to about 15 wt. % of steam, with the remainder being primarily $CO_2$), that steam is generally condensed to liquid water when the stream is used to warm up the $CO_2$ enriched sorbent in step 212. The gas/liquid stream exiting the now warmed up phase II tower at $P^2$ and at or about $T^5$ can be further cooled in a heat exchanger to $T^{atm}$ by using ambient air or a local water source. The gaseous $CO_2$ phase can then be separated from the cold liquid water in a phase separator, and the cold liquid can be used to cool the phase IV $CO_2$-depleted tower of step 204. The warm water that exits the tower at $T^6$, that is generally lower than $T^4$, can be depressurized (or decompressed) to $P^1$ using an expansion device similar to that described above, and mixed with the stream of liquid water at $P^1$ and $T^4$ that was produced in step 208 after condensation of steam and phase separation. The mixed water streams are then used on the cold side of the heat exchanger in step 210 to produce steam for phase III (step 210), as described above.

In some embodiments, the process of the present disclosure (e.g., the process 200 referring to FIG. 2 or the process 100 referring to FIG. 1) may be carried out in a batch mode. In other embodiments, the process may be carried out in a continuous mode. In a batch mode, multiple towers (or chambers) are used and the various streams, including the air stream, are directed to the various chambers sequentially for $CO_2$ capture. The chamber can be isolated from any or all streams in order for an engineer to undertake the various steps required to regenerate the sorbent or cool it down to the initial state to start a new cycle. Another way to operate a batch process may be to move the solid sorbent without altering any of the stream pathways. In this manner, the sorbent, either enriched in $CO_2$ or regenerated, is move from one chamber (or tower) to another to undergo the desorption/regeneration and the other steps. The process may be operated in a continuous manner using fluidized beds and sealing loops. A skilled engineer would be able to select and implement the appropriate machinery. Regardless of the mode of operation (batch or continuous), the process necessarily involves the four phases as discussed above.

Exemplary Process and System for $CO_2$ Capture

Figure 1:
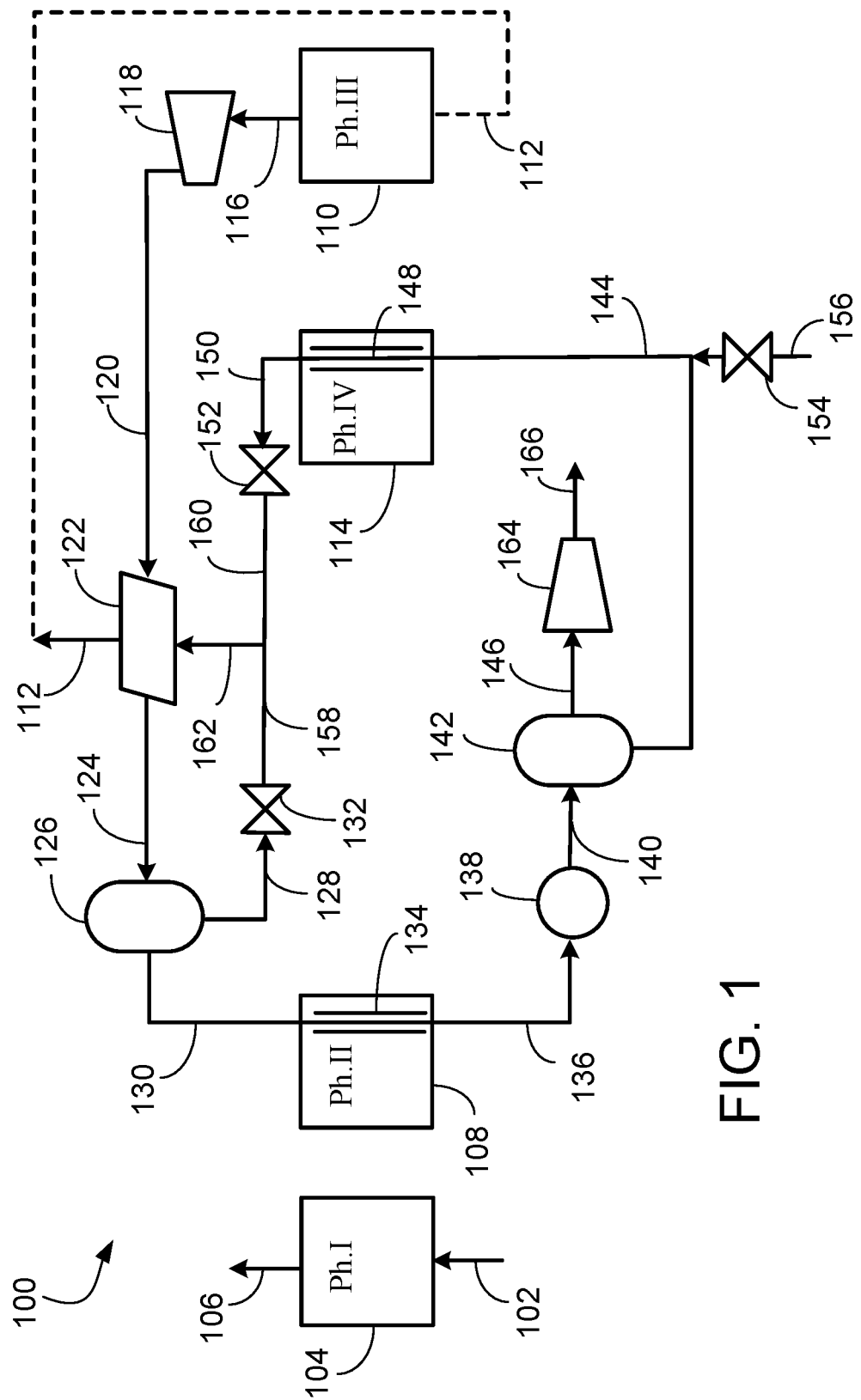
FIG. 1 is a schematic diagram of an exemplary process of the present disclosure.

An exemplary process 100 within the instant claims is schematically shown in FIG. 1. Referring to FIG. 1, a $CO_2$-containing stream of air 102 is blown into a sorbent tower 104, wherein the $CO_2$ is captured from the stream of air on or in the adsorbent material within the tower 104 (phase I of the process 100). In one example, the tower 104 is operated at ambient temperature and atmospheric pressure. A lean stream of air 106 exiting the adsorbent tower 104 is significantly depleted in $CO_2$ as compared to the $CO_2$ concentration in the stream 102. In one example, the lean stream 106 contains no more than about 10 ppm of $CO_2$, or even no $CO_2$ at all. A skilled mechanical engineer would be able to select and implement the process conditions (such as flow of air 102, an amount and kind of the adsorbent material, and dimensions of tower 104) to achieve this advantageous result. Once the sorbent material in the tower 104 is saturated with $CO_2$ or has reached a pre-determined level of $CO_2$ adsorption, the sorbent material is heated, for example, in tower 108 in order to bring the material to or near the regeneration temperature (phase II of the process 100). Once the material is heated to regeneration temperature in tower 108, the $CO_2$ is desorbed from the material, for example, in tower 110, by blowing a heated steam 112 (hot water vapor) into the tower 110, until all or substantially all of the $CO_2$ is removed by water vapor from the adsorbent material (phase III of the process 100). After that, the hot regenerated adsorbent material, depleted of $CO_2$, is cooled to ambient temperature, for example, in tower 114 (phase IV of the process), in order to be recycled and reused in tower 104 in phase I of the process 100.

During desorption of $CO_2$ in phase III of the process 100, steam 112 exchanges heat with the sorbent material, thereby facilitating dissociation of $CO_2$ from the material. In one example, temperature of the steam 112 is from about 80° C. to about 500° C., and the absolute pressure of the steam 112 is from about 0.5 bar to about 40 bar. In this example, the temperature of the steam 112 can be from about 100° C. to about 200° C., and the absolute pressure may be from about 1 bar to about 2 bar. The steam 112 also provides a sweeping force to carry the desorbed $CO_2$ from the tower 110, and to form a gaseous mixture 116 consisting of steam and desorbed $CO_2$, which then leaves the tower 110 for further processing. In one example, the weight ratio of steam to $CO_2$ in the mixture 116 is from about 10:1 to about 2,000:1, such as from about 50:1 to about 400:1. After flowing out of the tower 110, the stream 116 is compressed in a compression device 118 to a pressure ratio from about 1:1.01 to about 1:20, to form a stream of a compressed hot gas 120. In one example, compressor 118 compresses the hot gas 116 to a pressure ratio from about 1:1.05 to about 1:2, thereby increasing the temperature of the compressed gas 120. In this example, when the pressure of stream 116 is 1 bar, and the compressor 118 increases the pressure ratio about 1.2:1, the resultant absolute pressure of the gas mixture 120 is about 1.2 bar and the temperature of the compressed $H_2O$/$CO_2$ gaseous stream 120 is from about 115° C. to about 145° C. The hot compressed gas 120 then enters a heat exchanger 122, where it is contacted with a colder surface and a large portion of the steam is therefore condensed to liquid water. In one example, from about 50 wt. % to about 100 wt. %, or from about 85 wt. % to about 99 wt. % of gaseous steam is condensed to form liquid water. The mixture 124 composed of liquid water, residual steam (if any), and desorbed gaseous $CO_2$, while still under pressure, enters a phase separator device 126, where the liquid water 128 is physically separated from a gaseous phase 130. The liquid water 128 exits the separator 126 and enters an expansion device 132, to form a liquid water under a pressure equal to or slightly higher to that of the steam/$CO_2$ mixture 116. In one example, the pressure ratio across the expansion device 132 is a reverse of the ratio for the compression device 118. In this example, the pressure ratio in 132 is from about 1.01:1 to about 20:1, or from about 1.05:1 to about 2:1.

The vapor stream 130 leaving the separator 126 consists mainly of desorbed $CO_2$ and uncondensed water vapor, if any. The stream 130 may also contain non-condensable gases that were adsorbed in tower 104 during phase I and desorbed in tower 110 during phase III. Suitable examples of those non-condensable gases include $O_2$, $N_2$, $CH_4$, and Ar. The vapor stream 130 enters the tower 108 to exchange heat with the sorbent material in the tower during the heating phase II. This may be accomplished by using a heat exchanger 134. During this process, the $CO_2$ stream 130 is cooled, and the sorbent material is sufficiently heated up to undergo the desorption phase III. During this process, the temperature of the stream 130 is reduced and any steam that was not condensed in 122 is condensed in this heat exchange process in the tower 108. The mixture 136 consisting of cool $CO_2$ and any condensed water exit the heat exchanger 134 and may optionally enter a heat exchanger 138 in order to bring the $CO_2$ stream to ambient temperature. In this heat exchanger 138, the stream 136 is brought in contact with a cold surface, where the source of the low temperature may be ambient air or a stream of water form a nearby water source. This low temperature water may be fresh water or salty ocean or ground water. If any more uncondensed steam has remained in the stream 136, that residual steam is condensed in the heat exchanger 138. After cooling, the stream 140 enters a phase separator 142 (where heat exchanger 138 is absent, stream 136 directly enters the separator 142), where the liquid stream 144 is separated from the vapor stream 146, and the cold water stream 144 then enters a heat exchanger 148 to cool the sorbent material in tower 114 after desorption during phase IV of the process 100. If necessary, cold fresh water 156 may be added to the stream 144 by the means of shut off valve 154. The water exiting the valve 154 may be delivered at the required process pressure. This cold fresh water 156 can be sourced from a local fresh water source, such as a lake or ground water. Using the cold water stream 144 to cool off the sorbent material during phase IV advantageously allows to recover the heat accumulated during the desorption phase III, leading to reduced energy consumption in the exemplary process 100. In the meantime, the still pressurized warm water stream 150 that absorbed the heat from the sorbent material in the heat exchanger 148 is expanded in an expansion device 152 to a pressure ratio that is similar to the pressure ratio across the expansion device 132 and is reverse of the ratio in the compression device 118. In one example, the pressure ratio in 152 is from about 1.01:1 to about 20:1, or from about 1.05:1 to about 2:1, and the temperature of the warm water stream 160 exiting the expansion device 152 is generally lower than the temperature of the water stream 158 exiting the expansion device 132. The mixed amounts of the warm water stream 158 and the warm water stream 160 form a warm water stream 162 that is fed to the cold side of the heat exchanger 122, to form a stream of steam 112 that is fed to the tower 110 in the phase III of the process 100. In this process, the high pressure and high temperature stream 120 heats and evaporates the low pressure and low temperature water stream 162 to form steam 112, while condensing in the heat exchanger 122. In this manner, the water in the process 100 is reused and recycled, with the fresh water 156 being added as needed to compensate any losses. Excess water may also be removed from the system 100, by turning the valve 154 in the opposite direction. In one example, the pressure ratio in the system 100 (the pressure generated by compressor 118 and then released by valves 132 and 152) is set such that the condensing (slightly below boiling) temperature of the pressurized steam 120 is from about 1 K to about 50 K (or from about 1 K to about 5 K) greater than the evaporating (slightly above boiling) temperature of the warm water 162.

The vapor phase 146 exiting the phase separator 142 consists mainly of cold $CO_2$. This cold $CO_2$ stream may enter compressor 164 and then exit the system as a compressed $CO_2$ stream 166. The exit pressure of stream 166 may be from about 1 to about 300 bar. The $CO_2$ compressor 164 can integrate intercooling stages for increased performance and the heat dissipated in the intercooling stages transferred to pre-heat cold streams in process 100, such as feed water streams 156 or 144. That is, the pure or nearly pure $CO_2$ can be obtained in the form of a gas, a pressurized liquid, or be expanded to near ambient temperature after compression and cooling and be obtained as a dry ice (maintaining a temperature of about −78° C. at 1 atm.), depending on the utilization and/or sequestration needs. In some embodiments, the $CO_2$ in stream 166 is about 90 wt.

%, about 95 wt. %, or about 99 wt. % pure. The $CO_2$ may be sequestered or used to prepare a synthesis gas or liquid, or converted to another chemical compound, for example, acetic acid. The $CO_2$ may be used to grow plants or seaweed, which are subsequently used to prepare a biofuel, such as methanol, ethanol, or butanol, or a mixture thereof.

OTHER EMBODIMENTS

It is to be understood that while the present application has been described in conjunction with the detailed description thereof, the foregoing description is intended to illustrate and not limit the scope of the present application, which is defined by the scope of the appended claims. Other aspects, advantages, and modifications are within the scope of the following claims.

What is claimed is:

1. A method of capturing $CO_2$ from a $CO_2$-enriched gaseous stream, the method comprising:
   (i) contacting the $CO_2$-enriched gaseous stream with a $CO_2$-depleted solid hydrophobic sorbent material at about ambient temperature and at about ambient pressure, to produce a $CO_2$-depleted gaseous stream and a $CO_2$-enriched solid hydrophobic sorbent material;
   (ii) contacting the $CO_2$-enriched solid hydrophobic sorbent material produced in step (i) with a stream of steam at a first pressure and a first temperature, to produce the $CO_2$-depleted solid hydrophobic sorbent material and a $CO_2$-enriched stream of steam;
   wherein the first temperature is greater than the ambient temperature, and the first pressure is equal or below the saturation pressure corresponding to the first temperature;
   (iii) compressing the $CO_2$-enriched stream of steam produced in step (ii) to a second pressure and a second temperature, to produce a hot compressed $CO_2$-enriched stream of steam;
   wherein the second temperature is greater than the first temperature, and the second pressure is greater than the first pressure;
   (iv) condensing the hot compressed $CO_2$-enriched stream of steam produced in step (iii) to produce a stream of gaseous $CO_2$ at about a third temperature, a stream of water at about the first pressure and a fourth temperature, and an amount of thermal energy;
   wherein the second temperature is greater than the third temperature and the fourth temperature, and the first temperature is greater than or about equal to the fourth temperature;
   (v) heating the stream of water produced in step (iv) to produce the stream of steam at the first pressure and the first temperature for use in step (ii) using the thermal energy produced in step (iv); and
   (vi) contacting the $CO_2$-enriched solid hydrophobic sorbent material produced in step (i) with the stream of gaseous $CO_2$ produced in step (iv) to produce a stream of gaseous $CO_2$ at a fifth temperature and the $CO_2$-enriched solid hydrophobic sorbent material produced in step (i) at a temperature lower than or equal to the first temperature for use in step (ii);
   wherein the fifth temperature is lower than the third temperature.

2. The method of claim 1, wherein the $CO_2$-enriched gaseous stream is ambient air.

3. The method of claim 2, wherein the ambient air comprises from about 200 ppm to about 1000 ppm of $CO_2$.

4. The method of claim 1, wherein the $CO_2$-enriched gaseous stream is flue gas.

5. The method of claim 4, wherein the flue gas comprises from about 3 vol. % to about 35 vol. % of $CO_2$.

6. The method of claim 1, wherein the solid hydrophobic sorbent material is selected from an amine compound on a solid support, a zeolite, activated carbon, a metal-organic framework.

7. The method of claim 1, wherein the adsorption capacity of the $CO_2$-depleted solid hydrophobic sorbent material is from about 5 mg $CO_2$ to about 500 mg per about 1 g of the solid hydrophobic sorbent material.

8. The method of claim 1, wherein $CO_2$ capture rate in step (i) is from about 50 wt. % to about 100 wt. % relative to the initial amount of $CO_2$ in the $CO_2$ enriched gaseous stream.

9. The method of claim 1, wherein the first pressure of the stream of steam in step (ii) is from about 0.5 bar to about 2 bar, and the first temperature of the stream of steam in step (ii) is from about 80° C. to about 200° C.

10. The method of claim 1, wherein molar ratio of water to $CO_2$ in the $CO_2$-enriched stream of steam produced in step (ii) is from about 50:1 to about 500:1.

11. The method of claim 1, wherein a ratio of the second pressure to the first pressure is from about 1.01:1 to about 100:1.

12. The method of claim 1, wherein:
   the second pressure is about 1.5 bar and the first pressure is about 1 bar, and
   the second temperature is about 145° C. and the first temperature is about 100° C.

13. The method of claim 1, wherein from about 50 wt. % to about 100 wt. % of steam is condensed during condensing the hot compressed $CO_2$-enriched stream of steam in process (iv).

14. The method of claim 1, wherein the method is carried out in a batch mode or in a continuous mode.

15. A method of capturing $CO_2$ from a $CO_2$-enriched gaseous stream, the method comprising:
   contacting the $CO_2$-enriched gaseous stream with a $CO_2$-depleted solid water-adsorbing sorbent material at about ambient temperature and at about ambient pressure, to produce a $CO_2$-depleted gaseous stream and a $CO_2$-enriched solid water-adsorbing sorbent material;
   (ii) contacting the $CO_2$-enriched solid water-adsorbing sorbent material produced in step (i) with a stream of steam at a first pressure and a first temperature, to produce the $CO_2$-depleted solid water-adsorbing sorbent material and a $CO_2$-enriched stream of steam;
   wherein the first temperature is greater than the ambient temperature, and the first pressure is equal or below the saturation pressure corresponding to the first temperature;
   (iii) compressing the $CO_2$-enriched stream of steam produced in step (ii) to a second pressure and a second temperature, to produce a hot compressed $CO_2$-enriched stream of steam;
   wherein the second temperature is greater than the first temperature, and the second pressure is greater than the first pressure;
   (iv) condensing the hot compressed $CO_2$-enriched stream of steam produced in step (iii) to produce a stream of gaseous $CO_2$ at about a third temperature, a stream of water at about the first pressure and a fourth temperature, and an amount of thermal energy;

wherein the second temperature is greater than the third temperature and the fourth temperature, and the first temperature is greater than or about equal to the fourth temperature;

(v) heating the stream of water produced in step (iv) to produce the stream of steam at the first pressure and the first temperature for use in step (ii) using the thermal energy produced in step (iv); and (vi) contacting the $CO_2$-enriched solid water-adsorbing sorbent material produced in step (i) with the stream of gaseous $CO_2$ produced in step (iv) to produce a stream of gaseous $CO_2$ at a fifth temperature and the $CO_2$-enriched solid water-adsorbing sorbent material produced in step (i) at a temperature lower than or equal to the first temperature for use in step (ii);

wherein the fifth temperature is lower than the third temperature.

16. The method of claim 15, wherein the $CO_2$-enriched gaseous stream is ambient air.

17. The method of claim 16, wherein the ambient air comprises from about 200 ppm to about 1000 ppm of $CO_2$.

18. The method of claim 15, wherein the $CO_2$-enriched gaseous stream is flue gas.

19. The method of claim 18, wherein the flue gas comprises from about 3 vol. % to about 35 vol. % of $CO_2$.

20. The method of claim 15, wherein the adsorption capacity of the $CO_2$-depleted solid water-adsorbing sorbent material is from about 5 mg $CO_2$ to about 500 mg per about 1 g of the solid water-adsorbing sorbent material.

21. The method of claim 15, wherein $CO_2$ capture rate in step (i) is from about 50 wt. % to about 100 wt. % relative to the initial amount of $CO_2$ in the $CO_2$ enriched gaseous stream.

22. The method of claim 15, wherein the first pressure of the stream of steam in step (ii) is from about 0.5 bar to about 2 bar, and the first temperature of the stream of steam in step (ii) is from about 80° C. to about 200° C.

23. The method of claim 15, wherein molar ratio of water to $CO_2$ in the $CO_2$-enriched stream of steam produced in step (ii) is from about 50:1 to about 500:1.

24. The method of claim 15, wherein a ratio of the second pressure to the first pressure is from about 1.01:1 to about 100:1.

25. The method of claim 15, wherein:
the second pressure is about 1.5 bar and the first pressure is about 1 bar, and
the second temperature is about 145° C. and the first temperature is about 100° C.

26. The method of claim 15, wherein from about 50 wt. % to about 100 wt. % of steam is condensed during condensing the hot compressed $CO_2$-enriched stream of steam in process (iv).

27. The method of claim 15, wherein the method is carried out in a batch mode or in a continuous mode.

28. A method of capturing $CO_2$ from a $CO_2$-enriched gaseous stream, the method comprising:

contacting the $CO_2$-enriched gaseous stream with a $CO_2$-depleted sorbent material at about ambient temperature and at about ambient pressure, to produce a $CO_2$-depleted gaseous stream and a $CO_2$-enriched sorbent material;

(ii) contacting the $CO_2$-enriched sorbent material produced in step (i) with a stream of steam at a first pressure and a first temperature, to produce the $CO_2$-depleted sorbent material and a $CO_2$-enriched stream of steam;

wherein the first temperature is greater than the ambient temperature, and the first pressure is equal or below the saturation pressure corresponding to the first temperature;

(iii) compressing the $CO_2$-enriched stream of steam produced in step (ii) to a second pressure and a second temperature, to produce a hot compressed $CO_2$-enriched stream of steam;

wherein the second temperature is greater than the first temperature, and the second pressure is greater than the first pressure;

(iv) condensing the hot compressed $CO_2$-enriched stream of steam produced in step (iii) to produce a stream of gaseous $CO_2$ at about a third temperature, an initially formed stream of water at the second pressure, and an amount of thermal energy;

(v) decompressing the initially formed stream of water at the second pressured in step (iv) to form a stream of water at about the first pressure and the fourth temperature;

wherein the second temperature is greater than the third temperature and the fourth temperature, and the first temperature is greater than or about equal to the fourth temperature;

(vi) heating the stream of water produced in step (v) to produce the stream of steam at the first pressure and the first temperature for use in step (ii) using the thermal energy produced in step (iv); and (vii) contacting the $CO_2$-enriched sorbent material produced in step (i) with the stream of gaseous $CO_2$ produced in step (iv) to produce a stream of gaseous $CO_2$ at a fifth temperature and the $CO_2$-enriched sorbent material produced in step (i) at a temperature lower than or equal to the first temperature for use in step (ii);

wherein the fifth temperature is lower than the third temperature.

29. The method of claim 28, wherein the $CO_2$-enriched gaseous stream is ambient air.

30. The method of claim 29, wherein the ambient air comprises from about 200 ppm to about 1000 ppm of $CO_2$.

31. The method of claim 28, wherein the $CO_2$-enriched gaseous stream is flue gas.

32. The method of claim 31, wherein the flue gas comprises from about 3 vol. % to about 35 vol. % of $CO_2$.

33. The method of claim 28, wherein the adsorption capacity of the $CO_2$-depleted sorbent material is from about 5 mg $CO_2$ to about 500 mg per about 1 g of sorbent material.

34. The method of claim 28, wherein $CO_2$ capture rate in step (i) is from about 50 wt. % to about 100 wt. % relative to the initial amount of $CO_2$ in the $CO_2$ enriched gaseous stream.

35. The method of claim 28, wherein the first pressure of the stream of steam in step (ii) is from about 0.5 bar to about 2 bar, and the first temperature of the stream of steam in step (ii) is from about 80° C. to about 200° C.

36. The method of claim 28, wherein molar ratio of water to $CO_2$ in the $CO_2$-enriched stream of steam produced in step (ii) is from about 50:1 to about 500:1.

37. The method of claim 28, wherein a ratio of the second pressure to the first pressure is from about 1.01:1 to about 100:1.

38. The method of claim 28, wherein:
the second pressure is about 1.5 bar and the first pressure is about 1 bar, and
the second temperature is about 145° C. and the first temperature is about 100° C.

39. The method of claim 28, wherein from about 50 wt. % to about 100 wt. % of steam is condensed during condensing the hot compressed $CO_2$-enriched stream of steam in process (iv).

40. The method of claim 28, comprising using the stream of liquid water at the fifth temperature to cool the $CO_2$-depleted sorbent material produced in step (ii) from about the first temperature to about the fifth temperature.

41. The method of claim 28, wherein the method is carried out in a batch mode or in a continuous mode.

42. A method of capturing $CO_2$ from a $CO_2$-enriched gaseous stream, the method comprising:
  (i) contacting the $CO_2$-enriched gaseous stream with a $CO_2$-depleted sorbent material at about ambient temperature and at about ambient pressure, to produce a $CO_2$-depleted gaseous stream and a $CO_2$-enriched sorbent material;
  (ii) contacting the $CO_2$-enriched sorbent material produced in step (i) with a stream of steam at a first pressure and a first temperature, to produce the $CO_2$-depleted sorbent material and a $CO_2$-enriched stream of steam;
  wherein the first temperature is greater than the ambient temperature, and the first pressure is equal or below the saturation pressure corresponding to the first temperature;
  (iii) compressing the $CO_2$-enriched stream of steam produced in step (ii) to a second pressure and a second temperature, to produce a hot compressed $CO_2$-enriched stream of steam;
  wherein the second temperature is greater than the first temperature, and the second pressure is greater than the first pressure;
  (iv) condensing the hot compressed $CO_2$-enriched stream of steam produced in step (iii) to produce a stream of gaseous $CO_2$ at about a third temperature, a stream of water at about the first pressure and a fourth temperature, and an amount of thermal energy;
  wherein the second temperature is greater than the third temperature and the fourth temperature, and the first temperature is greater than or about equal to the fourth temperature;
  (v) heating the stream of water produced in step (iv) to produce the stream of steam at the first pressure and the first temperature for use in step (ii) using the thermal energy produced in step (iv);
  (vi) contacting the $CO_2$-enriched sorbent material produced in step (i) with the stream of gaseous $CO_2$ produced in step (iv) to produce a stream of gaseous $CO_2$ at a fifth temperature and the $CO_2$-enriched sorbent material produced in step (i) at a temperature lower than or equal to the first temperature for use in step (ii);
  wherein the fifth temperature is lower than the third temperature; and
  (vii) using a stream of liquid water at the fifth temperature to cool the $CO_2$-depleted sorbent material produced in step (ii) from about the first temperature to about the fifth temperature.

43. The method of claim 42, wherein the $CO_2$-enriched gaseous stream is ambient air.

44. The method of claim 43, wherein the ambient air comprises from about 200 ppm to about 1000 ppm of $CO_2$.

45. The method of claim 42, wherein the $CO_2$-enriched gaseous stream is flue gas.

46. The method of claim 45, wherein the flue gas comprises from about 3 vol. % to about 35 vol. % of $CO_2$.

47. The method of claim 42, wherein the adsorption capacity of the $CO_2$-depleted sorbent material is from about 5 mg $CO_2$ to about 500 mg per about 1 g of sorbent material.

48. The method of claim 42, wherein $CO_2$ capture rate in step (i) is from about 50 wt. % to about 100 wt. % relative to the initial amount of $CO_2$ in the $CO_2$ enriched gaseous stream.

49. The method of claim 42, wherein the first pressure of the stream of steam in step (ii) is from about 0.5 bar to about 2 bar, and the first temperature of the stream of steam in step (ii) is from about 80° C. to about 200° C.

50. The method of claim 42, wherein molar ratio of water to $CO_2$ in the $CO_2$-enriched stream of steam produced in step (ii) is from about 50:1 to about 500:1.

51. The method of claim 42, wherein a ratio of the second pressure to the first pressure is from about 1.01:1 to about 100:1.

52. The method of claim 42, wherein:
  the second pressure is about 1.5 bar and the first pressure is about 1 bar, and
  the second temperature is about 145° C. and the first temperature is about 100° C.

53. The method of claim 42, wherein from about 50 wt. % to about 100 wt. % of steam is condensed during condensing the hot compressed $CO_2$-enriched stream of steam in process (iv).

54. The method of claim 42, wherein the method is carried out in a batch mode or in a continuous mode.

* * * * *

UNITED STATES PATENT AND TRADEMARK OFFICE
CERTIFICATE OF CORRECTION

| | |
|---|---|
| PATENT NO. | : 11,617,981 B1 |
| APPLICATION NO. | : 17/567670 |
| DATED | : April 4, 2023 |
| INVENTOR(S) | : Mourad Younes et al. |

It is certified that error appears in the above-identified patent and that said Letters Patent is hereby corrected as shown below:

In the Claims

Column 14, Line 42, Claim 15, before "contacting" insert -- (i) --.

Column 15, Line 58, Claim 28, before "contacting" insert -- (i) --.

Signed and Sealed this
Twenty-third Day of May, 2023

Katherine Kelly Vidal
*Director of the United States Patent and Trademark Office*